(12) United States Patent
Watarai

(10) Patent No.: US 9,919,616 B2
(45) Date of Patent: Mar. 20, 2018

(54) CONTROL SYSTEM FOR BICYCLE

(71) Applicant: SHIMANO INC., Sakai (JP)

(72) Inventor: Etsuyoshi Watarai, Sakai (JP)

(73) Assignee: SHIMANO INC., Sakai (JP)

( * ) Notice: Subject to any disclaimer, the term of this patent is extended or adjusted under 35 U.S.C. 154(b) by 10 days.

(21) Appl. No.: 14/692,685

(22) Filed: Apr. 21, 2015

(65) Prior Publication Data

US 2016/0311491 A1    Oct. 27, 2016

(51) Int. Cl.
| | |
|---|---|
| B62J 99/00 | (2009.01) |
| B60L 15/20 | (2006.01) |
| B62M 1/36 | (2013.01) |
| G05B 15/02 | (2006.01) |
| B62M 25/08 | (2006.01) |

(52) U.S. Cl.
CPC ............. B60L 15/20 (2013.01); B62M 25/08 (2013.01); *B62J 2099/002* (2013.01); *B62J 2099/0013* (2013.01); *Y02T 10/7258* (2013.01)

(58) Field of Classification Search
CPC ........................ H05B 37/0272; H05B 37/0227
See application file for complete search history.

(56) References Cited

U.S. PATENT DOCUMENTS

| | | | |
|---|---|---|---|
| 8,909,424 B2 | 12/2014 | Jordan et al. | |
| 2005/0073438 A1* | 4/2005 | Rodgers | G08G 1/166 340/944 |
| 2006/0226879 A1* | 10/2006 | Kitamura | B62M 25/08 327/94 |
| 2011/0156866 A1* | 6/2011 | Denison | B60R 25/102 340/5.54 |
| 2012/0322594 A1 | 12/2012 | Kitamura et al. | |
| 2013/0049860 A1* | 2/2013 | Kitamura | B62J 99/00 330/129 |
| 2014/0102237 A1* | 4/2014 | Jordan | B62K 23/02 74/473.12 |
| 2015/0180517 A1* | 6/2015 | Abe | G08C 17/00 455/99 |

* cited by examiner

*Primary Examiner* — Redhwan K Mawari
*Assistant Examiner* — Rodney P King
(74) *Attorney, Agent, or Firm* — Mori & Ward, LLP

(57) ABSTRACT

A control system for a bicycle comprises a movement-information obtaining device, an actuator, an actuation controller, and a mode controller. The movement-information obtaining device is configured to obtain movement information indicating a movement of at least part of a first bicycle portion and configured to wirelessly output the movement information. The actuator is configured to actuate at least a second bicycle portion. The actuation controller has a wake mode to control the actuator based on an input signal and a sleep mode to be suspended under an electrical power consumption lower than an electrical power consumption in the wake mode. The mode controller is configured to wirelessly receive the movement information and configured to switch the actuation controller from the sleep mode to the wake mode based on the movement information.

20 Claims, 25 Drawing Sheets

CONTROL SYSTEM FOR BICYCLE

BACKGROUND OF THE INVENTION

Field of the Invention

The present invention relates to a control system for a bicycle.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is an electrical bicycle component that is electrically operated.

SUMMARY OF THE INVENTION

In accordance with a first aspect of the present invention, a control system for a bicycle comprises a movement-information obtaining device, an actuator, an actuation controller, and a mode controller. The movement-information obtaining device is configured to obtain movement information indicating a movement of at least part of a first bicycle portion and configured to wirelessly output the movement information. The actuator is configured to actuate at least a second bicycle portion. The actuation controller has a wake mode to control the actuator based on an input signal and a sleep mode to be suspended under an electrical power consumption lower than an electrical power consumption in the wake mode. The mode controller is configured to wirelessly receive the movement information and configured to switch the actuation controller from the sleep mode to the wake mode based on the movement information.

In accordance with a second aspect of the present invention, the control system according to the first aspect is configured so that the mode controller includes a detector circuit configured to detect carrier wave including the movement information and is configured to switch the actuation controller from the sleep mode to the wake mode in response to detection of the movement information included in the carrier wave.

In accordance with a third aspect of the present invention, the control system according to the first aspect is configured so that the sleep mode includes a light sleep mode to be suspended under an electrical power consumption lower than an electrical power consumption in the wake mode and a deep sleep mode to be turned off.

In accordance with a fourth aspect of the present invention, the control system according to the first aspect is configured so that the second bicycle portion includes a movable member. The movable member is configured to be movable relative to a base member that is configured to be attached to a bicycle frame.

In accordance with a fifth aspect of the present invention, the control system according to the fourth aspect is configured so that the first bicycle portion includes a chain cage assembly. The chain cage assembly includes a pulley and a pulley support member. The pulley is configured to engage with a bicycle chain. The pulley support member is configured to rotatably support the pulley. The movable member is configured to support the chain cage assembly thereon. The actuator is configured to move the movable member to shift the bicycle chain. The movement-information obtaining device is configured to sense a rotation of the pulley relative to the pulley support member to obtain the movement information.

In accordance with a sixth aspect of the present invention, the control system according to the first aspect is configured so that the first bicycle portion includes a bicycle frame and a wheel rotatable relative to the bicycle frame. The movement-information obtaining device is configured to sense a rotation of the wheel relative to the bicycle frame to obtain the movement information.

In accordance with a seventh aspect of the present invention, the control system according to the first aspect is configured so that the first bicycle portion includes a bicycle frame and a bicycle chain. The movement-information obtaining device is configured to sense a rotation of the bicycle chain relative to the bicycle frame to obtain the movement information.

In accordance with an eighth aspect of the present invention, the control system according to the first aspect is configured so that the first bicycle portion includes a bicycle frame and a crank assembly rotatable relative to the bicycle frame. The movement-information obtaining device is configured to sense a rotation of the crank assembly relative to the bicycle frame to obtain the movement information.

In accordance with a ninth aspect of the present invention, the control system according to the first aspect is configured so that the first bicycle portion includes a bicycle frame and a crank assembly rotatable relative to the bicycle frame. The movement-information obtaining device is configured to sense a pedaling force applied to the crank assembly to obtain the movement information.

In accordance with a tenth aspect of the present invention, the bicycle control system according to the first aspect further comprises a vibration-information obtaining device. The vibration-information obtaining device is configured to obtain vibration information indicating a vibration of a bicycle. The mode controller is configured to switch the actuation controller from the sleep mode to the wake mode based on the movement information and the vibration information.

In accordance with an eleventh aspect of the present invention, a control system for a bicycle comprises a rider-information obtaining device, an actuator, an actuation controller, and a mode controller. The rider-information obtaining device is configured to obtain rider information indicating that a rider is on a bicycle from a third bicycle portion and configured to wirelessly output the rider information. The actuator is configured to actuate at least a second bicycle portion. The actuation controller has wake mode to control the actuator based on an input signal and a sleep mode to be suspended under an electrical power consumption lower than an electrical power consumption in the wake mode. The mode controller is configured to wirelessly receive the rider information and configured to switch the actuation controller from the sleep mode to the wake mode based on the rider information.

In accordance with a twelfth aspect of the present invention, the control system according to the eleventh aspect is configured so that the third bicycle portion includes a suspension. The rider-information obtaining device is configured to obtain, as the rider information, a change in pressure in the suspension.

In accordance with a thirteenth aspect of the present invention, the control system according to the eleventh aspect is configured so that the third bicycle portion includes a seatpost. The rider-information obtaining device is configured to obtain, as the rider information, a change in pressure in the seatpost.

In accordance with a fourteenth aspect of the present invention, the bicycle control system according to the eleventh aspect further comprises a vibration-information obtaining device. The vibration-information obtaining device is configured to obtain vibration information indicating a vibration of the bicycle. The mode controller is configured to switch the actuation controller from the sleep mode to the wake mode based on the rider information and the vibration information.

In accordance with a fifteenth aspect of the present invention, the control system according to the eleventh aspect is configured so that the mode controller includes a detector circuit configured to detect carrier wave including the rider-information and is configured to switch the actuation controller from the sleep mode to the wake mode in response to detection of the movement information included in the carrier wave.

In accordance with a sixteenth aspect of the present invention, the control system according to the eleventh aspect is configured so that the sleep mode includes a light sleep mode to be suspended under an electrical power consumption lower than an electrical power consumption in the wake mode and a deep sleep mode to be turned off.

In accordance with a seventeenth aspect of the present invention, a control system for a bicycle comprises an operation-information obtaining device, an actuator, an actuation controller, and a mode controller. The operation-information obtaining device is configured to obtain operation information indicating that a user operates an input part of an operating device and to wirelessly output the operation information. The actuator is configured to actuate at least a second bicycle portion. The actuation controller having a wake mode to control the actuator based on an input signal and a sleep mode to be suspended under an electrical power consumption lower than an electrical power consumption in the wake mode. The mode controller is configured to wirelessly receive the operation information and to switch the actuation controller from the sleep mode to the wake mode based on the operation information.

In accordance with an eighteenth aspect of the present invention, the control system according to the seventeenth aspect further comprises a vibration-information obtaining device. The vibration-information obtaining device is configured to obtain vibration information indicating a vibration of a bicycle. The mode controller is configured to switch the actuation controller from the sleep mode to the wake mode based on the operation information and the vibration information.

In accordance with a nineteenth aspect of the present invention, the control system according to the seventeenth aspect is configured so that the mode controller includes a detector circuit configured to detect carrier wave including the operation information and is configured to switch the actuation controller from the sleep mode to the wake mode in response to detection of the movement information included in the carrier wave.

In accordance with a twentieth aspect of the present invention, the control system for a bicycle according to the seventeenth aspect is configured so that the sleep mode includes a light sleep mode to be suspended under an electrical power consumption lower than an electrical power consumption in the wake mode and a deep sleep mode to be turned off.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
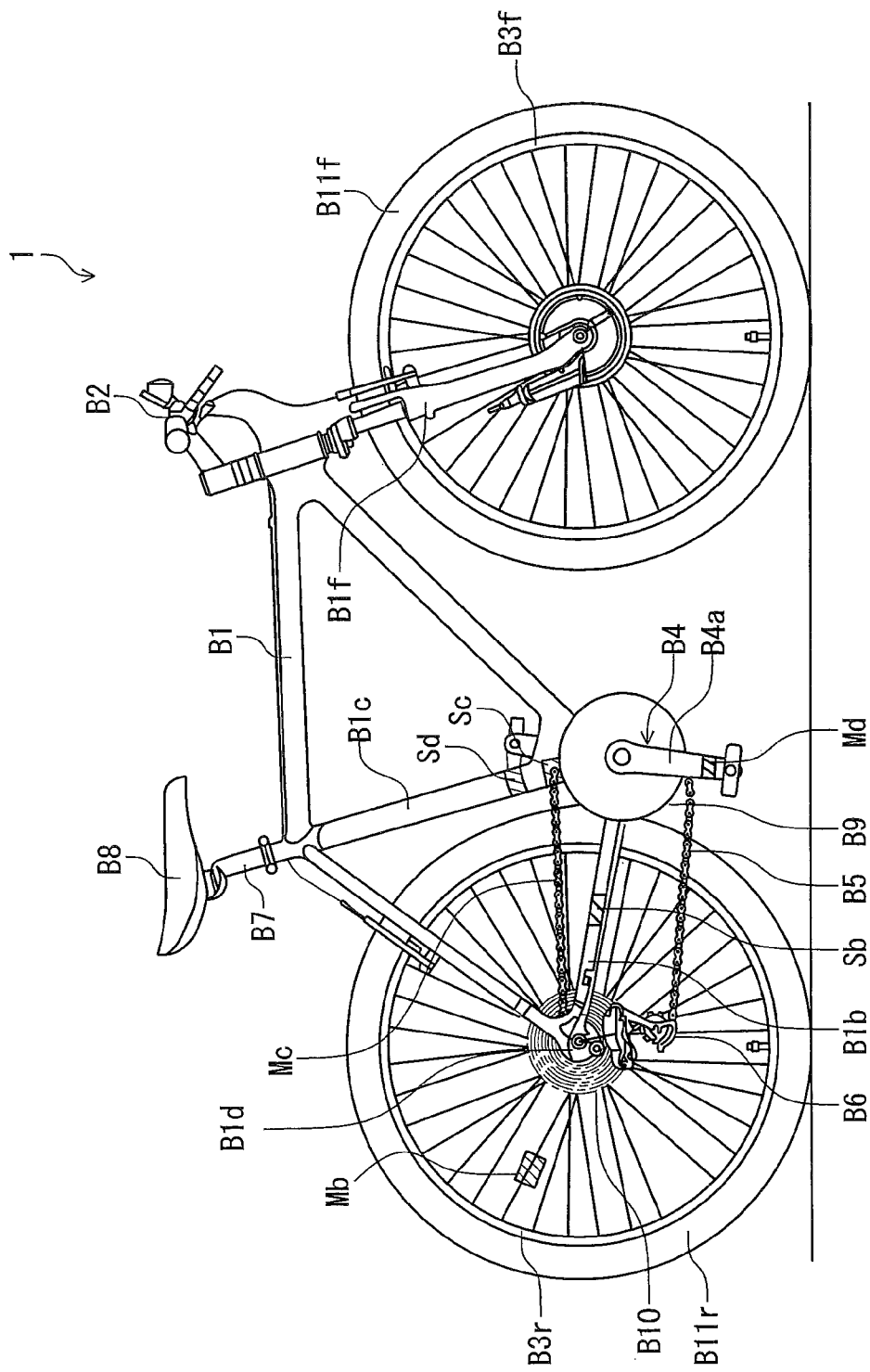
FIG. 1 is a side elevational view of a bicycle.

The embodiments will now be described with reference to the accompanying drawings, wherein like reference numerals designate corresponding or identical elements throughout the various drawings.

First Embodiment

FIG. 1 is a side elevational view of a bicycle 1.

As shown in FIG. 1, the bicycle 1 includes a bicycle frame B1, a handlebar B2, wheels B3r and B3f, a crank assembly B4, a bicycle chain B5, a shifting device B6, a seatpost B7, and a saddle B8.

The handlebar B2 is mounted on the bicycle frame B1. Each of the wheels B3r and B3f is rotatably attached to the bicycle frame B1. Tires B11r and B11f are attached to the wheels B3r and B3f, respectively. The crank assembly B4 is configured to rotate relative to the bicycle frame B1. The bicycle 1 includes a front sprocket B9 and a rear sprocket B10. The bicycle chain B5 is provided between the front sprocket B9 and the rear sprocket B10. The shifting device B6 is configured to selectively engage the bicycle chain B5 with one of the gears by shift the bicycle chain B5. The seatpost B7 is provide on the bicycle frame B1. The saddle B8 is mounted on the seatpost B7.

In the present application, the directional terms "front", "rear", "forward", "rearward", "left", "right", "transverse", "upward" and "downward" as well as any other similar directional terms refer to those directions which are determined on the basis of a user (e.g., a rider) who sits on the saddle B8 of the bicycle 1 with facing the handlebar B2. Accordingly, these terms, as utilized to describe bicycle components, should be interpreted relative to the bicycle 1 equipped with the bicycle components as used in an upright riding position on a horizontal surface.

Figure 2:
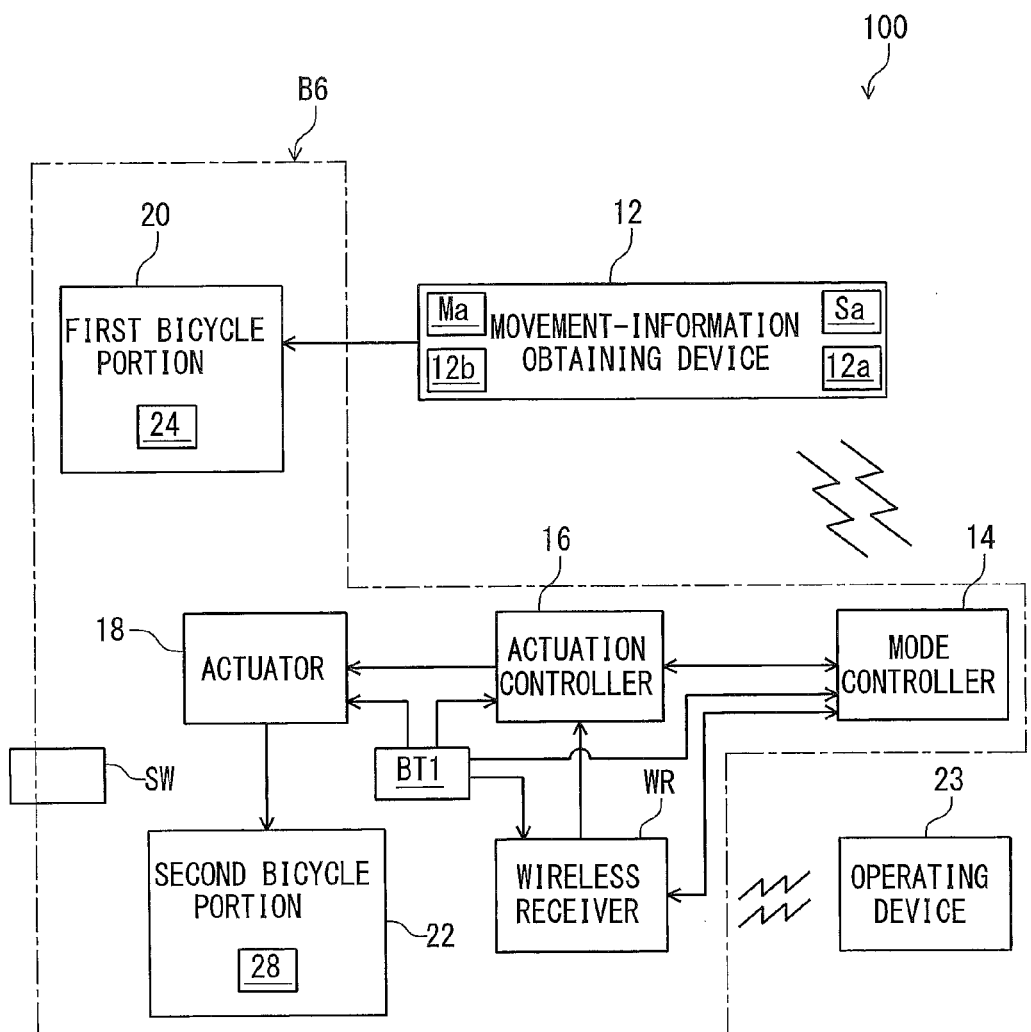
FIG. 2 is a block diagram illustrating a configuration of a control system for a bicycle in accordance with a first embodiment.

FIG. 2 is a block diagram illustrating a configuration of a control system 100 in accordance with this embodiment. The bicycle 1 is equipped with the control system 100.

As shown in FIG. 2, the control system 100 comprises a movement-information obtaining device 12, a mode controller 14, an actuation controller 16, and an actuator 18. The movement-information obtaining device 12 is operatively connected to the mode controller 14. The mode controller 14 is operatively connected to the actuation controller 16. The actuation controller 16 is operatively connected to the actuator 18. Specifically, the movement-information obtaining device 12 is wirelessly connected to the mode controller 14. The mode controller 14 is electrically connected to the actuation controller 16 via a signal line. The actuation controller 16 is electrically connected to the actuator 18 via the signal line.

The movement-information obtaining device 12 is configured to obtain movement information. The movement information indicates a movement of at least part of a first bicycle portion 20. The movement-information obtaining device 12 is configured to wirelessly output the movement information.

The actuator 18 is configured to actuate at least a second bicycle portion 22.

The actuation controller 16 has the wake mode to control the actuator 18 based on an input signal. The actuation controller 16 also has a sleep mode to be suspended under an electrical power consumption lower than an electrical power consumption in the wake mode. In the illustrated embodiment, the sleep mode includes a light sleep mode to be suspended under an electrical power consumption lower than an electrical power consumption in the wake mode and a deep sleep mode to be turned off. An electrical power consumption in the deep sleep mode is lower than an electrical power consumption in the light sleep mode. A switching time from the deep sleep mode to the wake mode is shorter than a switching time from the light sleep mode to the wake mode.

Figure 3:
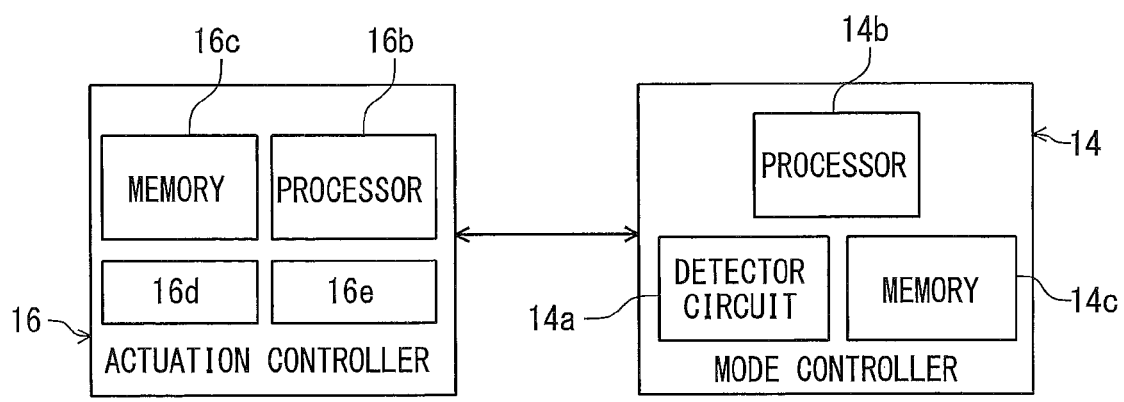
FIG. 3 is an enlarged block diagram illustrating a configuration of a mode controller and an actuation controller.

The mode controller 14 is configured to wirelessly receive the movement information. The mode controller 14 is configured to switch the actuation controller 16 from the sleep mode to the wake mode based on the movement information. For example, the movement-information obtaining device 12 is configured to wirelessly transmit carrier wave to the mode controller 14. Specifically, the movement-information obtaining device 12 includes a wireless transmitter 12a configured to wirelessly transmit the carrier wave to the mode controller 14. The carrier wave includes the movement information. As shown in FIG. 3, the mode controller 14 includes a detector circuit 14a configured to detect the carrier wave. The mode controller 14 is configured to switch the actuation controller 16 from the sleep mode to the wake mode in response to detection of the movement information included in the carrier wave. The detector circuit 14a serves as a wireless receiver configured to establish a wireless communication with the wireless transmitter 12a (FIG. 2) of the movement-information obtaining device 12.

The mode controller 14 switches the actuation controller 16 from the wake mode to the sleep mode when the mode controller 14 does not receive the movement information for a predetermined time period. In the illustrated embodiment, the mode controller 14 switches the actuation controller 16 from the wake mode to the sleep mode when the detector circuit 14a does not detect the movement information included in the carrier wave for the predetermined time period.

As seen in FIG. 3, the mode controller 14 is constituted as a microcomputer and includes a processor 14b and a memory 14c. The processor 14b includes a central processing unit (CPU). The memory 14c includes a read only memory (ROM) and a random access memory (RAM). For example, a program stored in the memory 14c is read into the processor 14b, and thereby functions of the mode controller 14 are performed.

Similarly, the actuation controller 16 is constituted as a microcomputer and includes a processor 16b and a memory 16c. The processor 16b includes a CPU. The memory 16c includes a ROM and a RAM. For example, a program stored in the memory 16c is read into the processor 16b, and thereby functions of the actuation controller 16 are performed.

In this embodiment, the mode controller 14 and the actuation controller 16 are separately provided from each other. However, the mode controller 14 and the actuation controller 16 can be integrally provided with each other as a single controller if needed and/or desired.

As seen in FIG. 3, the actuation controller 16 includes a position sensor 16d and a driver unit 16e. The position sensor 16d is configured to sense a current position of the actuator 18. The driver unit 16e is configured to control the actuator 18 based on a command signal from the processor 16b and the current position sensed by the position sensor 16d.

In this embodiment, as seen in FIG. 2, the shifting device B6 is a bicycle rear derailleur. The shifting device B6 includes the first bicycle portion 20 and the second bicycle portion 22. The mode controller 14, the actuation controller 16, and the actuator 18 are provided in the shifting device B6.

Figure 4:
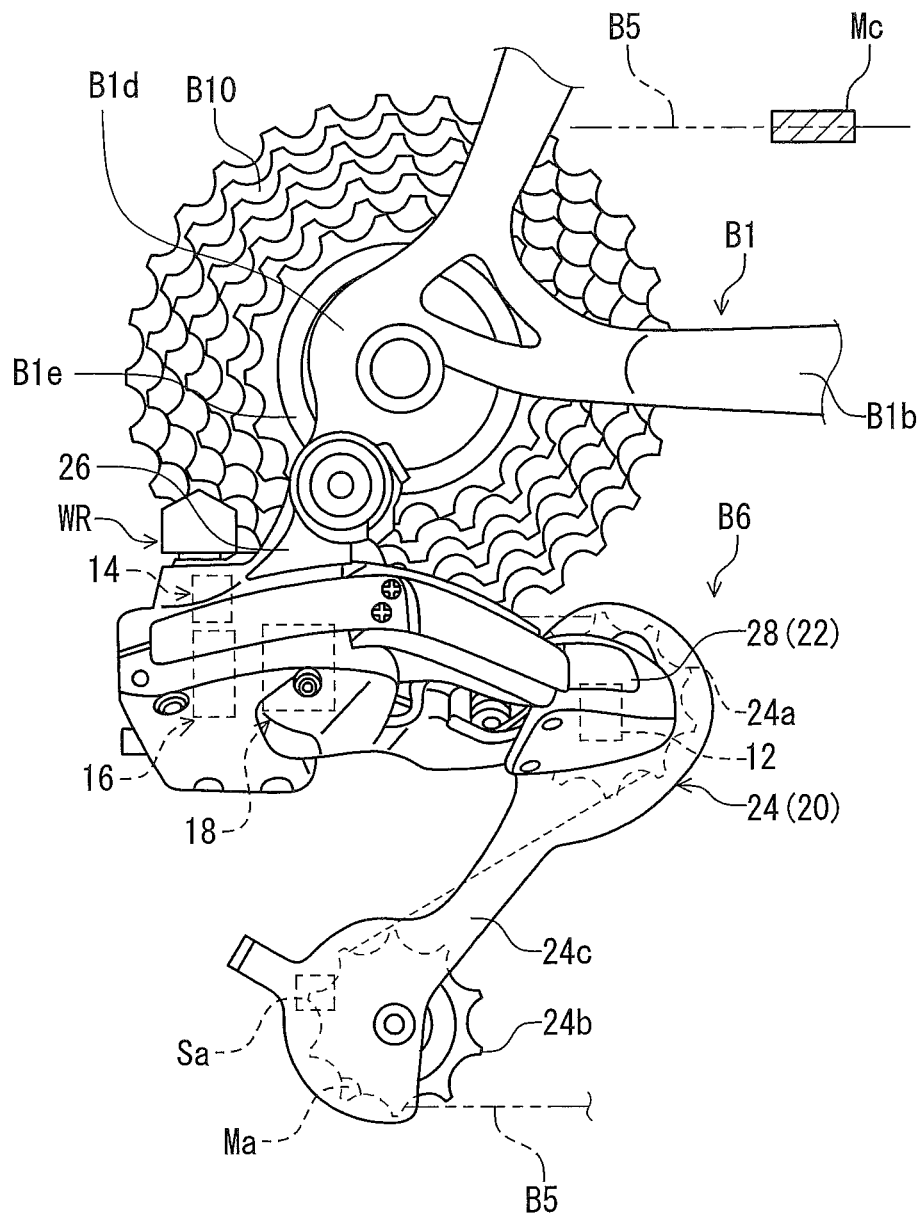
FIG. 4 is an enlarged view of a rear sprocket and a shifting device.

FIG. 4 is an enlarged view of the rear sprocket B10 and the shifting device B6. In FIG. 4, the bicycle chain B5 is depicted with a two-dot chain line for simplification. As shown in FIG. 4, the first bicycle portion 20 includes a chain cage assembly 24. The chain cage assembly 24 includes a pulley configured to engage with the bicycle chain B5. The chain cage assembly 24 also includes a pulley support member configured to rotatably support the pulley. In the illustrated embodiment, the chain cage assembly 24 includes pulleys 24a and 24b configured to engage with the bicycle chain B5. The chain cage assembly 24 also includes a pulley support member 24c configured to rotatably support the pulleys 24a and 24b.

Figure 5:
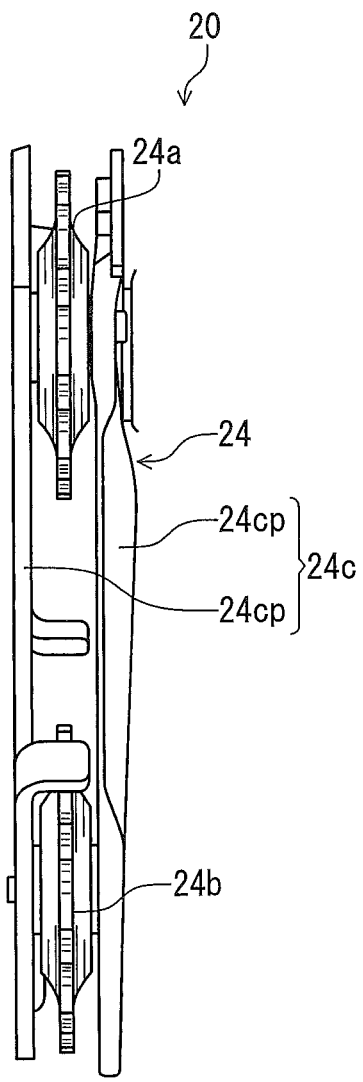
FIG. 5 is an enlarged view of a chain cage assembly viewed from front.

FIG. 5 is an enlarged front elevational view of the chain cage assembly 24. As shown in FIG. 5, the pulley support member 24c includes a pair of chain cage plates 24cp. The pulleys 24a and 24b are disposed between the chain cage plates 24cp.

In this embodiment, as seen in FIG. 4, the shifting device B6 includes a base member 26. The bicycle frame B1 includes rear end portions B1d to which the rear wheel B3r (FIG. 1) is rotatably attached. As shown in FIG. 4, the base member 26 is configured to be attached to a derailleur hanger B1e formed on one of the rear end portions B1d. The base member 26 is configured to be attached to the bicycle frame B1. The second bicycle portion 22 includes a movable member 28. The movable member 28 is configured to be movable relative to the base member 26. The movable member 28 is configured to support the chain cage assembly 24 thereon. The movable member 28 is coupled to the base member 26 and is movable relative to the base member 26. The movable member 28 supports the chain cage assembly 24. The chain cage assembly 24 is pivotally mounted to the movable member 28.

In the illustrated embodiment, the movement-information obtaining device 12 is configured to sense a rotation of the pulley 24b relative to the pulley support member 24c to obtain the movement information. However, the movement-information obtaining device 12 can be configured to sense a rotation of the pulley 24a relative to the pulley support member 24c to obtain the movement information if needed and/or desired. The movement-information obtaining device 12 is attached to the pulley support member 24c to sense a rotation of the pulley 24b relative to the pulley support member 24c.

For example, the movement-information obtaining device 12 includes a first magnetized part Ma and a first sensor Sa. Examples of the first magnetized part Ma include a permanent magnet. Examples of the first sensor Sa include a magnetic sensor. As shown in FIG. 4, the first magnetized part Ma is attached to the pulley 24b. The first sensor Sa is attached to the pulley support member 24c. When the user pedals the bicycle 1, the pulley 24b rotates relative to the pulley support member 24c. The first magnetized part Ma passes through a sensing area of the first sensor Sa by each rotation of the pulley 24b so that the first sensor Sa senses the rotation of the pulley 24b. Namely, the first sensor Sa of the movement-information obtaining device 12 obtains the movement information indicating the movement of a part (i.e., the pulley 24b) of the first bicycle portion 20. The wireless transmitter 12a is configured to wirelessly transmit the movement information sensed by the first sensor Sa to the mode controller 14.

The actuation controller 16 and the actuator 18 are provided inside the base member 26. The actuator 18 is configured to move the movable member 28 to shift the bicycle chain B5. More specifically, the actuator 18 is configured to move the movable member 28 and the chain cage assembly 24 laterally relative to the base member 26 to shift the bicycle chain B5 under the control of the actuation controller 16. Examples of the actuator 18 include a direct-current motor and a stepper motor.

As seen in FIG. 2, the control system 100 further comprises an operating device 23 configured to receive an input operation from the user and is configured to wirelessly transmit the input signal to the shifting device B6 in response to the input operation.

Figure 6:
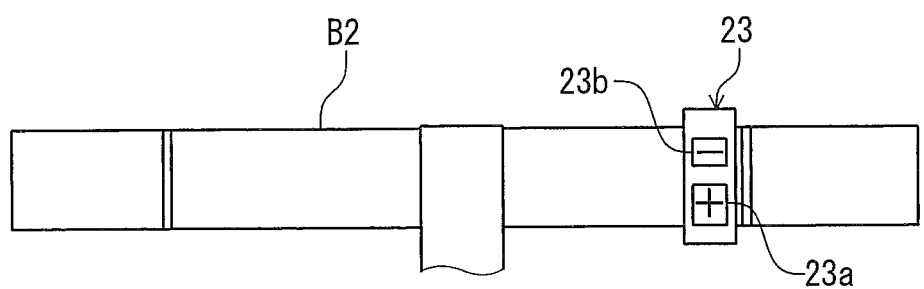
FIG. 6 is an enlarged view of a handlebar viewed from above.

FIG. 6 is an enlarged view of the handlebar B2 viewed from above. In this embodiment, as seen in FIG. 6, the operating device 23 is attached to the handlebar B2. The operating device 23 includes an upshifting switch 23a and a downshifting switch 23b. The operating device 23 is configured to receive an upshifting operation form the user via the upshifting switch 23a. The operating device 23 is configured to receive a downshifting operation form the user via the downshifting switch 23b.

As seen in FIG. 2, the shifting device B6 includes a wireless receiver WR configured to wirelessly receive the input signal from the operating device 23. The operating device 23 is configured to wirelessly transmit an upshifting signal to the wireless receiver WR in response to the upshifting operation. The operating device 23 is configured to wirelessly transmit a downshifting signal to the wireless receiver WR in response to the downshifting operation. The wireless receiver WR is operatively connected to the actuator controller 16. The wireless receiver WR is configured to transmit the input signal (e.g., the upshifting signal and the downshifting signal) to the actuation controller 16.

In the wake mode, the actuation controller 16 is configured to control the actuator 18 to actuate the second bicycle portion 22 based on the input signal (e.g., the upshifting signal and the downshifting signal) from the operating device 23. In the sleep mode, the actuation controller 16 is configured not to respond with the input signal (e.g., the upshifting signal and the downshifting signal) from the operating device 23. In the illustrated embodiment, the mode controller 14 switches the wireless receiver WR between the wake mode and the sleep mode along with the actuation controller 16. While the actuation controller 16 is wirelessly connected to the operating device 23 in the illustrated embodiment, the actuation controller 16 can be electrically connected to the operating device 23 via a signal line if needed and/or desired.

As seen in FIG. 2, the control system 100 further comprises a battery BT1. The battery BT1 is configured to supply electric power to each of the actuator 18, the actuation controller 16, the mode controller 14, and the wireless receiver WR. Examples of the battery BT1 include a rechargeable battery such as a lithium-ion battery. The battery BT1 is provided in the shifting device B6. An electrical power consumption of the battery BT1 can be reduced in the sleep mode (the light and deep sleep modes). The movement-information obtaining device 12 includes a battery 12b provided separately from the battery BT1.

As seen in FIG. 2, the control system 100 further comprises a power switch SW via which a user is to turn on and off the control system 100. When the control system 100 is turned on via the power switch SW, supply of the electric power from the battery BT1 is started. When the control system 100 is turned off via the power switch SW, supply of the electric power from the battery BT1 is stopped. The power switch SW can be omitted from the control system 100 if needed and/or desired.

Figure 7:
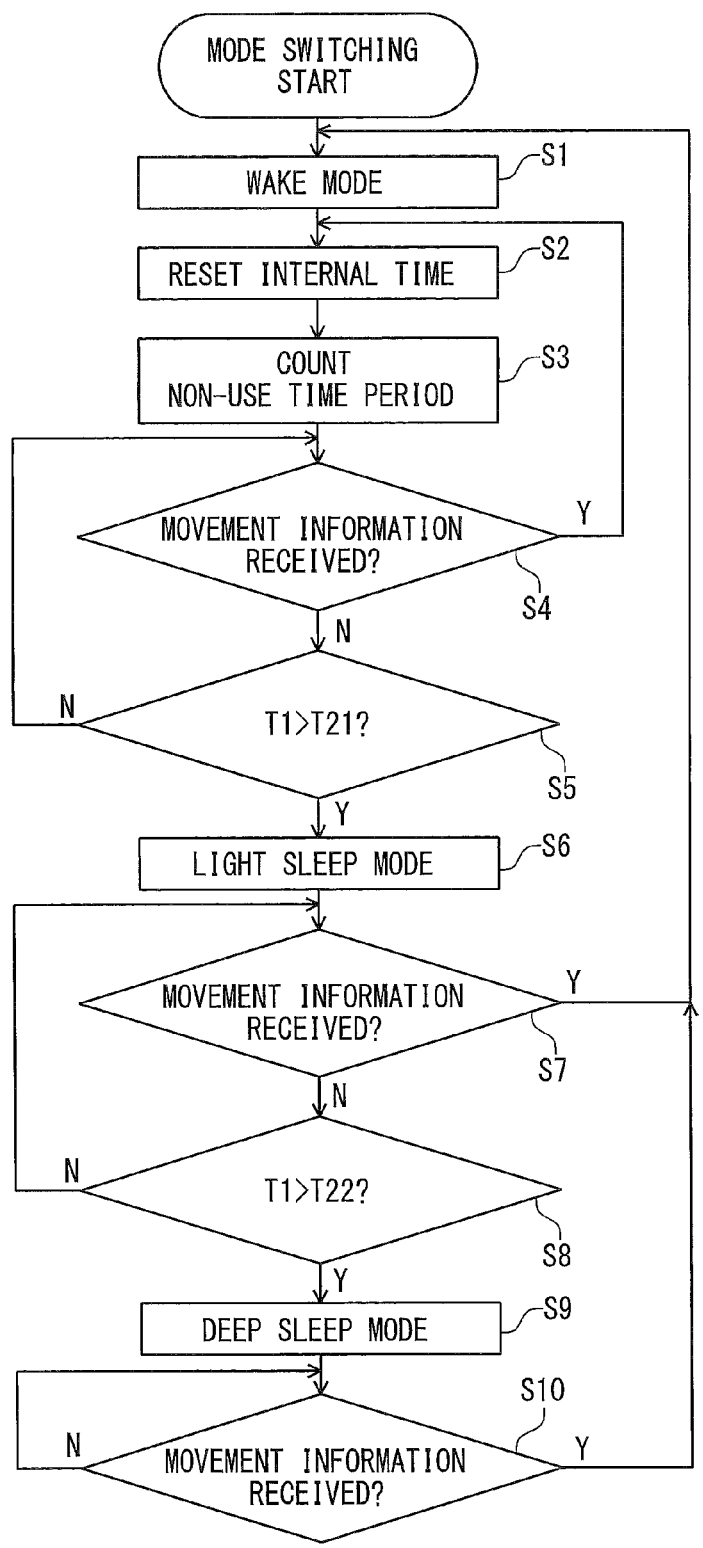
FIG. 7 is a diagram for explaining an operation of the bicycle shifting system in accordance with the first embodiment.

Next, an operation of the control system 100 in accordance with this embodiment will be described referring to FIG. 7. FIG. 7 is a flow chart showing the operation of the control system 100 in accordance with this embodiment.

When the control system 100 is turned on via the power switch SW, the wake mode is applied to the actuation controller 16 (step S1). An internal timer to count a non-use time period is reset in the mode controller 14 (step S2). The internal time of the mode controller 14 starts to count the non-use time period (step S3).

The mode controller 14 determines whether the mode controller 14 receives the movement information from the movement-information obtaining device 12 (step S4). The movement-information obtaining device 12 obtains the movement information indicating the movement of at least part of the first bicycle portion 20. In this embodiment, as shown in FIG. 4, the movement-information obtaining device 12 senses the rotation of the pulley 24b to obtain the movement information indicating the rotation of the pulley 24b relative to the pulley support member 24c when the user pedals the bicycle 1. When the movement-information obtaining device 12 obtains the movement information, the movement-information obtaining device 12 wirelessly transmits the movement information to the mode controller 14.

When the mode controller 14 wirelessly receives the movement information from the movement-information obtaining device 12 in the wake mode, the mode controller 14 resets the internal timer and restart to count the non-use time period (steps S2 and S3). When the mode controller 14 does not receive the movement information from the movement-information obtaining device 12, the mode controller 14 compares the counted non-use time period T1 with a first predetermined time period T21 (steps S4 and S5).

When the counted non-use time period T1 is equal to or shorter than the first predetermined time period T21, the mode controller 14 keeps monitoring the movement information (steps S4 and S5). The first predetermined time period T21 is stored in the memory 14b of the mode controller 14 (FIG. 2).

When the counted non-use time period T1 is longer than the first predetermined period T21, the mode controller 14 switches the actuation controller 16 from the wake mode to the sleep mode. In the illustrated embodiment, the mode controller 14 switches the actuation controller 16 from the wake mode to the light sleep mode (step S6). In the light sleep mode, the actuation controller 16 is suspended under the lower electrical power consumption and does not control the actuator 18 regardless of the input signal from the operating device 23.

When the mode controller 14 wirelessly receives the movement information in the light sleep mode, the mode controller 14 switches the actuation controller 16 from the sleep mode (the light sleep mode) to the wake mode based on the movement information (steps S1 and S7). The mode controller 14 resets the internal timer and restart to count the non-use time period (steps S2 and S3). In the wake mode, the actuation controller 16 controls the actuator 18 to actuate the second bicycle portion 22 based on the input signal from the operating device 23.

When the mode controller 14 does not receive the movement information in the light sleep mode, the mode controller 14 compares the counted non-use time period T1 with a second predetermined time period T22 (step S8). The second predetermined time period T22 is longer than the first predetermined time period T21 and is stored in the memory 14a of the mode controller 14 (FIG. 2). When the counted non-use time period T1 is equal to or shorter than the second predetermined time period T22, the mode controller 14 keeps monitoring the movement information (steps S7 and S8).

When the counted non-use time period T1 is longer than the second predetermined time period T22, the mode controller 14 switches the actuation controller 16 from the light sleep mode to the deep sleep mode (step S9). In the deep sleep mode, the actuation controller 16 is turned off and does not control the actuator 18 regardless of the input signal from the operating device 23.

When the mode controller 14 does not receive the movement information in the deep sleep mode, the mode controller 14 keeps monitoring the movement information (step S10). When the mode controller 14 wirelessly receives the movement information in the deep sleep mode, the mode controller 14 switches the actuation controller 16 from the sleep mode (the deep sleep mode) to the wake mode (steps S1 and S10). The mode controller 14 resets the internal timer and restart to count the non-use time period (steps S2 and S3). In the wake mode, when the actuation controller 16 receives the input signal from the operating device 23, the actuation controller 16 controls the actuator 18 to actuate the second bicycle portion 22 based on the input signal from the operating device 23.

For example, in the wake mode, the actuation controller 16 controls the actuator 18 to move the movable member 28 in an upshifting direction relative to the base member 26 when the actuating controller 16 receives an upshifting signal from the operating device 23. In the wake mode, the actuation controller 16 controls the actuator 18 to move the movable member 28 in a downshifting direction relative to the base member 26 when the actuating controller 16 receives a downshifting signal from the operating device 23. Then, the actuation controller 16 controls the actuator 18 based on the input signal so that the actuator 18 moves the movable member 28 to shift the bicycle chain B5 in the wake mode.

While the sleep mode includes the light sleep mode and the deep sleep mode in the illustrated embodiment, one of the light sleep mode and the deep sleep mode can be omitted from the sleep mode if needed and/or desired. For example, in a case where the deep sleep mode is omitted from the sleep mode, the steps S7 to S9 are omitted from the flow chart of FIG. 6, and the step S10 follows the step S6. Furthermore, the sleep mode can include at least one additional sleep mode having features different from the features of the light sleep mode and the deep sleep mode in addition to the light sleep mode and the deep sleep mode.

With the control system 100, the actuation controller 16 has the wake mode to control the actuator 18 based on an input signal and the sleep mode to be suspended under the electrical power consumption lower than the electrical power consumption in the wake mode. The mode controller 14 is configured to wirelessly receive the movement information and is configured to switch the actuation controller 16 from the sleep mode to the wake mode based on the movement information. Accordingly, it is possible to easily change the actuation controller 16 from the sleep mode to the wake mode by detecting the movement of at least part of the first bicycle portion 20.

Second Embodiment

A control system 200 in accordance with a second embodiment will be described below referring to FIG. 8. The control system 200 has substantially the same configuration as the control system 100 except for elements corresponding to the first bicycle portion 20 and the movement information obtaining device 12. Thus, elements having substantially the same function as those in the first embodiment will be numbered the same here, and will not be described and/or illustrated again in detail here for the sake of brevity.

Figure 8:
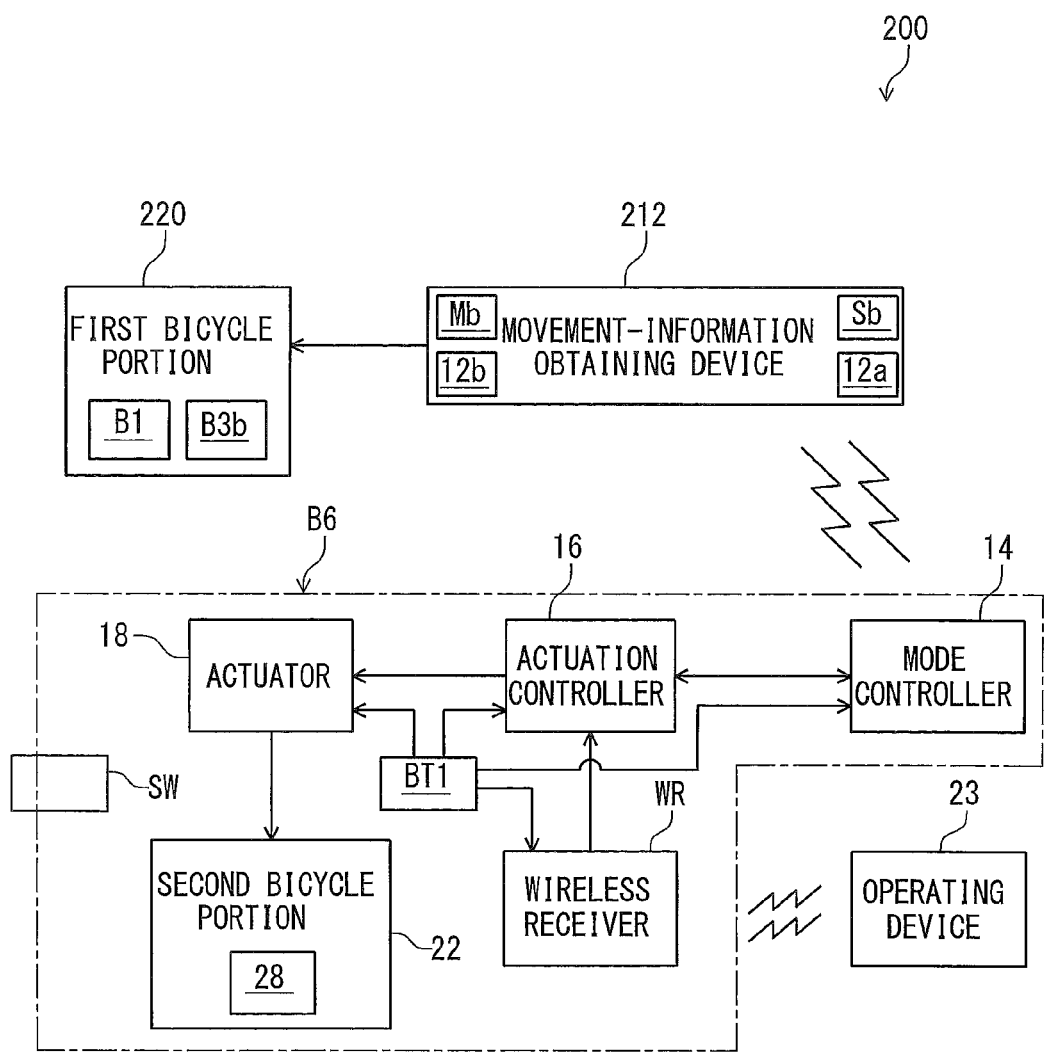
FIG. 8 is a block diagram illustrating a configuration of a control system in accordance with a second embodiment.

As seen in FIG. 8, the control system 200 comprises a movement-information obtaining device 212 configured to obtain movement information indicating a movement of at least part of a first bicycle portion 220. In the illustrated embodiment, the first bicycle portion 220 includes the bicycle frame B1 and the wheel rotatable relative to the bicycle frame B1. The wheel can be at least one of the front wheel B3f and rear wheel B3r. In the following description, the first bicycle portion 220 includes the bicycle frame B1 and the rear wheel B3r rotatable relative to the rear end portions B1d.

The movement-information obtaining device 212 has substantially the same configuration as that of the movement-information obtaining device 12. In this embodiment, however, the movement-information obtaining device 212 is configured to sense a rotation of the wheel B3r and/or B3f relative to the bicycle frame B1 to obtain the movement information. In the following description, the movement-information obtaining device 212 senses a rotation of the rear wheel B3r relative to the chainstays B1b.

For example, the movement-information obtaining device 212 includes a second magnetized part Mb and a second sensor Sb. Examples of the second magnetized part Mb include a permanent magnet. Examples of the second sensor Sb include a magnetic sensor. As shown in FIG. 1, the second magnetized part Mb is attached to a spoke of the rear wheel B3r. The second sensor Sb is attached to one of the chainstays B1b. When the user pedals the bicycle 1, the rear wheel B3r rotates relative to the bicycle frame B1 (specifically, the one of the chainstay B1b). The second magnetized part Mb passes through a sensing area of the second sensor Sb by each rotation of the rear wheel B3r so that the second sensor Sb senses the rotation of the rear wheel B3r. Namely, the second sensor Sb of the movement-information obtaining device 212 obtains the movement information indicating the movement of a part (i.e., the rear wheel B3r) of the first bicycle portion 220. The wireless transmitter 12a is configured to wirelessly transmit the movement information sensed by the second sensor Sb to the mode controller 14.

An operation of the control system 200 in accordance with this embodiment is substantially the same operation of the control system 100 in accordance with the first embodiment (see FIG. 7). In this embodiment, however, the movement-information obtaining device 212 senses the rotation of the wheel B3r relative to the bicycle frame B1 to obtain the movement information. Namely, in the steps S4, S7, and S10 of FIG. 7, the movement-information obtaining device 212 senses the rotation of the rear wheel B3r to obtain the movement information indicating the rotation of the rear wheel B3r relative to the bicycle frame B1 when the user pedals the bicycle 1. When the movement-information obtaining device 212 obtains the movement information, the movement-information obtaining device 212 wirelessly transmits the movement information to the mode controller 14.

With the control system 200, the actuation controller 16 has the wake mode to control the actuator 18 based on an input signal and the sleep mode to be suspended under the electrical power consumption lower than the electrical power consumption in the wake mode. The mode controller 14 is configured to wirelessly receive the movement information and is configured to switch the actuation controller 16 from the sleep mode to the wake mode based on the movement information. Accordingly, it is possible to easily change the actuation controller 16 from the sleep mode to the wake mode by detecting the movement of at least part of the first bicycle portion 220.

Third Embodiment

A control system 300 in accordance with a third embodiment will be described below referring to FIG. 9. The control system 300 has substantially the same configuration as the control system 100 except for elements corresponding to the first bicycle portion 20 and the movement information obtaining device 12. Thus, elements having substantially the same function as those in the first embodiment will be numbered the same here, and will not be described and/or illustrated again in detail here for the sake of brevity.

Figure 9:
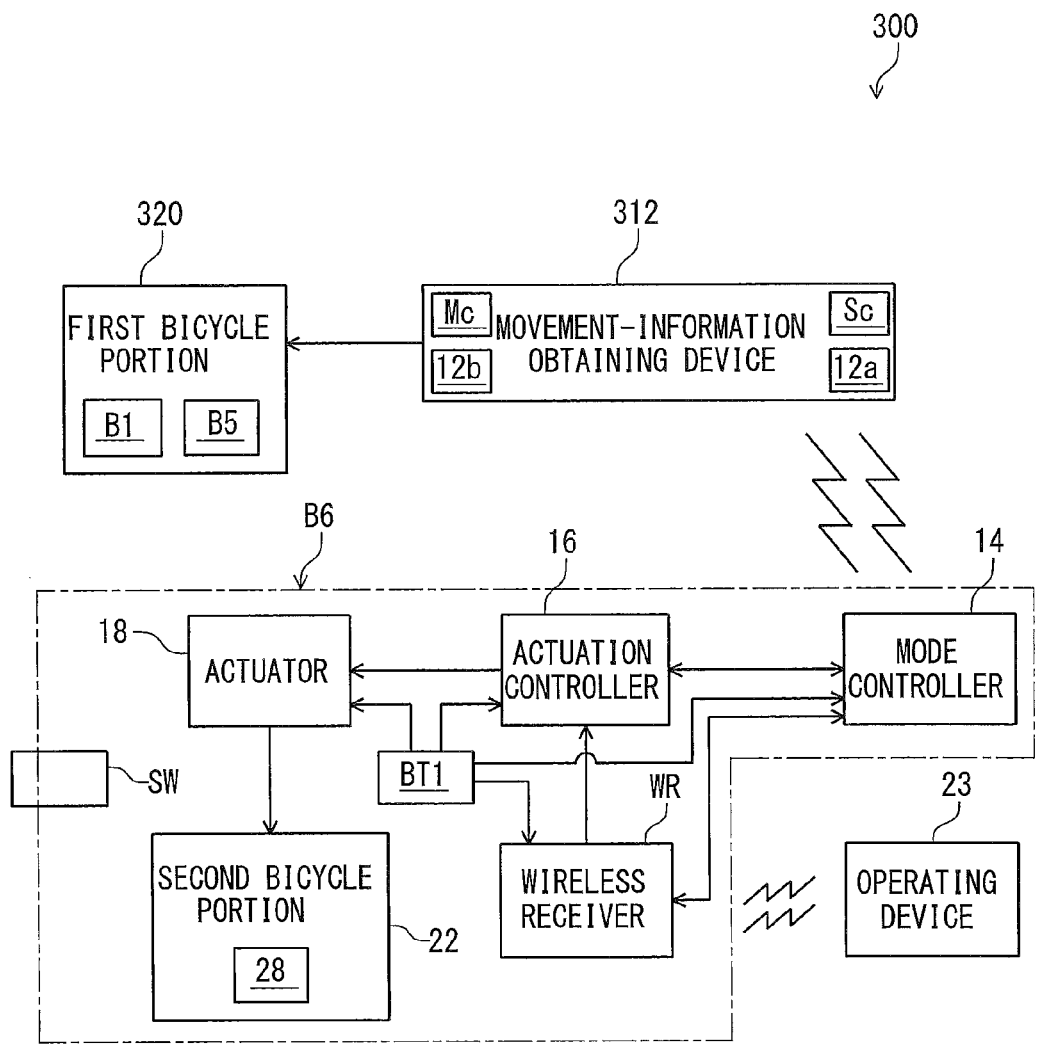
FIG. 9 is a block diagram illustrating a configuration of a control system in accordance with a third embodiment.

As seen in FIG. 9, the control system 300 comprises a movement-information obtaining device 312 configured to obtain movement information indicating a movement of at least part of a first bicycle portion 320. In the illustrated embodiment, the first bicycle portion 320 includes the bicycle frame B1 and the bicycle chain B5 rotatable relative to the bicycle frame B1. In the following description, the first bicycle portion 320 includes the bicycle frame B1 and the bicycle chain B5 rotatable relative to a seat tube B1c. As seen in FIG. 1, the bicycle frame B1 includes the seat tube B1c to which the seatpost B7 is attached.

The movement-information obtaining device 312 has substantially the same configuration as that of the movement-information obtaining device 12. In this embodiment, however, the movement-information obtaining device 312 is configured to sense a rotation of the bicycle chain B5 relative to the bicycle frame B1 to obtain the movement information. In the following description, the movement-information obtaining device 312 senses a rotation of the bicycle chain B5 relative to the seat tube B1c.

For example, the movement-information obtaining device 312 includes a third magnetized part Mc and a third sensor Sc. Examples of the third magnetized part Mc include a permanent magnet. Examples of the third sensor Sc include a magnetic sensor. As shown in FIGS. 1 and 4, the third magnetized part Mc is attached to the bicycle chain B5. The third magnetized part Mc can be a magnetized link plate of the bicycle chain B5. The third sensor Sc is attached to the seat tube B1c. When the user pedals the bicycle 1, the bicycle chain B5 rotates relative to the bicycle frame B1 (specifically, the seat tube B1c). The third magnetized part Mc passes through a sensing area of the third sensor Sc by each rotation of the bicycle chain B5 so that the third sensor Sc senses the rotation of the bicycle chain B5. Namely, the third sensor Sc of the movement-information obtaining device 312 obtains the movement information indicating the movement of a part (i.e., bicycle chain B5) of the first bicycle portion 320. The wireless transmitter 12a is configured to wirelessly transmit the movement information sensed by the third sensor Sc to the mode controller 14.

An operation of the control system 300 in accordance with this embodiment is substantially the same operation of the control system 100 in accordance with first embodiment (see FIG. 7). In this embodiment, however, the movement-information obtaining device 312 senses the rotation of the bicycle chain B5 relative to the bicycle frame B1 to obtain the movement information. Namely, in the steps S4, S7, and S10 of FIG. 7, the movement-information obtaining device 312 senses the rotation of the bicycle chain B5 to obtain the movement information indicating the rotation of the bicycle chain B5 relative to the bicycle frame B1. When the movement-information obtaining device 312 obtains the movement information, the movement-information obtaining device 312 wirelessly transmits the movement information to the mode controller 14.

With the control system 300, the actuation controller 16 has the wake mode to control the actuator 18 based on an input signal and the sleep mode to be suspended under the electrical power consumption lower than the electrical power consumption in the wake mode. The mode controller 14 is configured to wirelessly receive the movement information and is configured to switch the actuation controller 16 from the sleep mode to the wake mode based on the movement information. Accordingly, it is possible to easily change the actuation controller 16 from the sleep mode to the wake mode by detecting the movement of at least part of the first bicycle portion 320.

Fourth Embodiment

A control system 400 in accordance with a fourth embodiment will be described below referring to FIG. 10. The control system 400 has substantially the same configuration as the control system 100 except for elements corresponding to the first bicycle portion 20 and the movement information obtaining device 12. Thus, elements having substantially the same function as those in the first embodiment will be numbered the same here, and will not be described and/or illustrated again in detail here for the sake of brevity.

Figure 10:
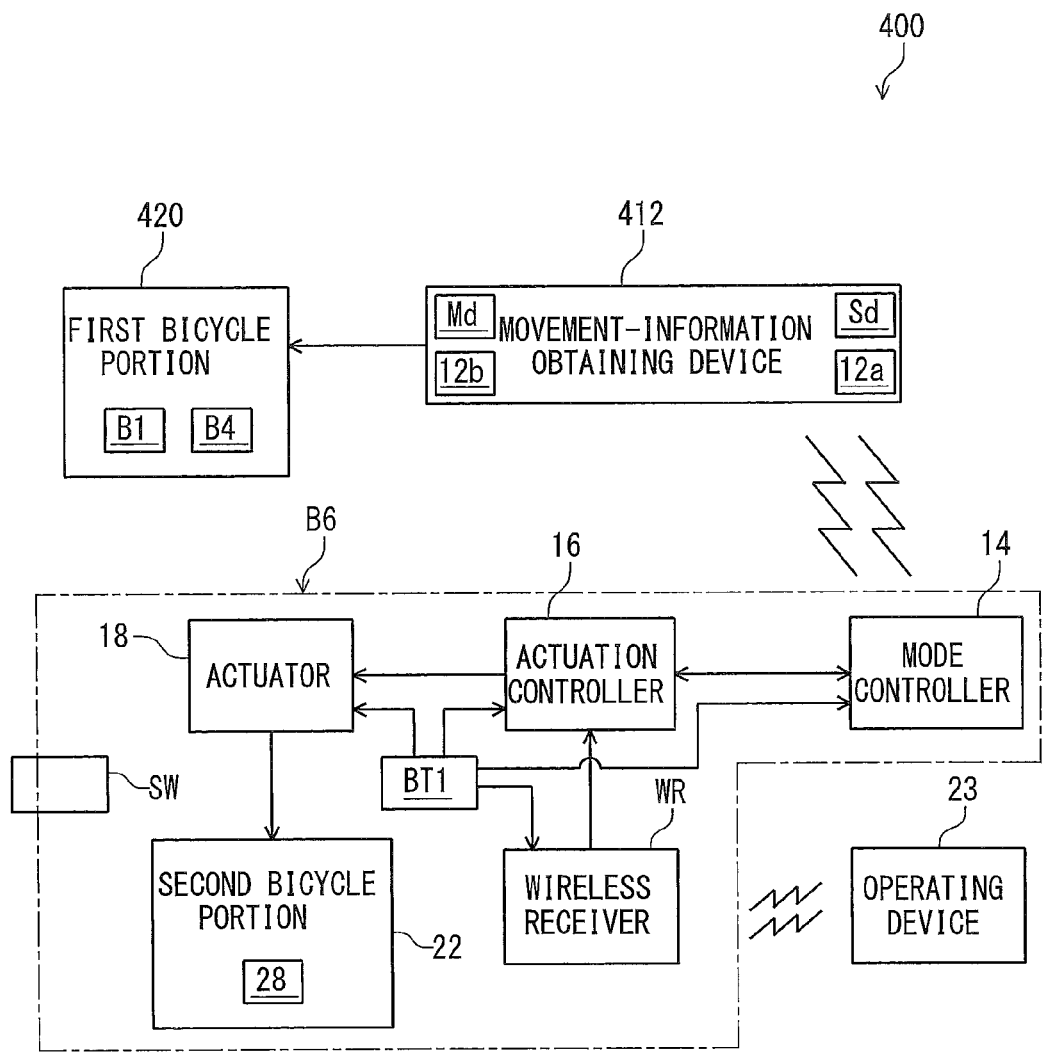
FIG. 10 is a block diagram illustrating a configuration of a control system in accordance with a fourth embodiment.

As seen in FIG. 10, the control system 400 comprises a movement-information obtaining device 412 configured to obtain movement information indicating a movement of at least part of a first bicycle portion 420. In the illustrated embodiment, the first bicycle portion 420 includes the bicycle frame B1 and the crank assembly B4 rotatable relative to the bicycle frame B1. In the following description, the first bicycle portion 420 includes the bicycle frame B1 and the crank assembly B4 rotatable relative to the seat tube B1c.

The movement-information obtaining device 412 has substantially the same configuration as that of the movement-information obtaining device 12. In this embodiment, however, the movement-information obtaining device 412 is configured to sense a rotation of the crank assembly B4 relative to the bicycle frame B1 to obtain the movement information. In the following description, the movement-information obtaining device 412 senses the rotation of the crank assembly B4 relative to the seat tube B1c.

For example, the movement-information obtaining device 412 includes a fourth magnetized part Md and a fourth sensor Sd. Examples of the fourth magnetized part Md include a permanent magnet. Examples of the fourth sensor Sd include a magnetic sensor. As shown in FIG. 1, the fourth magnetized part Md is attached to crank assembly B4. As shown in FIG. 1, the crank assembly B4 includes crank arms B4a. The fourth magnetized part Md is attached to one of the crank arms B4a. The fourth sensor Sd is attached to the seat tube B1c. When the user pedals the bicycle 1, the crank assembly B4 (specifically, the crank arms B4a) rotates relative to the bicycle frame B1 (specifically, the seat tube B1c). The fourth magnetized part Md passes through a sensing area of the fourth sensor Sd by each rotation of the crank arms B4a so that the fourth sensor Sd senses the rotation of the crank assembly B4. Namely, the fourth sensor Sd of the movement-information obtaining device 412 obtains the movement information indicating the movement of a part (i.e., the crank assembly B4) of the first bicycle portion 420. The wireless transmitter 12a is configured to wirelessly transmit the movement information sensed by the fourth sensor Sd to the mode controller 14.

An operation of the control system 400 in accordance with this embodiment is substantially the same operation of the control system 100 in accordance with first embodiment (see FIG. 7). In this embodiment, however, the movement-information obtaining device 412 senses the rotation of the crank assembly B4 relative to the bicycle frame B1 to obtain the movement information. Namely, in the steps S4, S7, and S10 of FIG. 7, the movement-information obtaining device 412 senses the rotation of the crank assembly B4 to obtain the movement information indicating the rotation of the crank assembly B4 relative to the bicycle frame B1 when the user pedals the bicycle 1. When the movement-information obtaining device 412 obtains the movement information, the movement-information obtaining device 412 wirelessly transmits the movement information to the mode controller 14.

With the control system 400, the actuation controller 16 has the wake mode to control the actuator 18 based on an input signal and the sleep mode to be suspended under the electrical power consumption lower than the electrical power consumption in the wake mode. The mode controller 14 is configured to wirelessly receive the movement information and is configured to switch the actuation controller 16 from the sleep mode to the wake mode based on the movement information. Accordingly, it is possible to easily change the actuation controller 16 from the sleep mode to the wake mode by detecting the movement of at least part of the first bicycle portion 420.

Fifth Embodiment

A control system 500 in accordance with a fifth embodiment will be described below referring to FIG. 11. The control system 500 has substantially the same configuration as the control system 400 except for element corresponding to the movement information obtaining device 412. Thus, elements having substantially the same function as those in the first embodiment will be numbered the same here, and will not be described and/or illustrated again in detail here for the sake of brevity.

Figure 11:
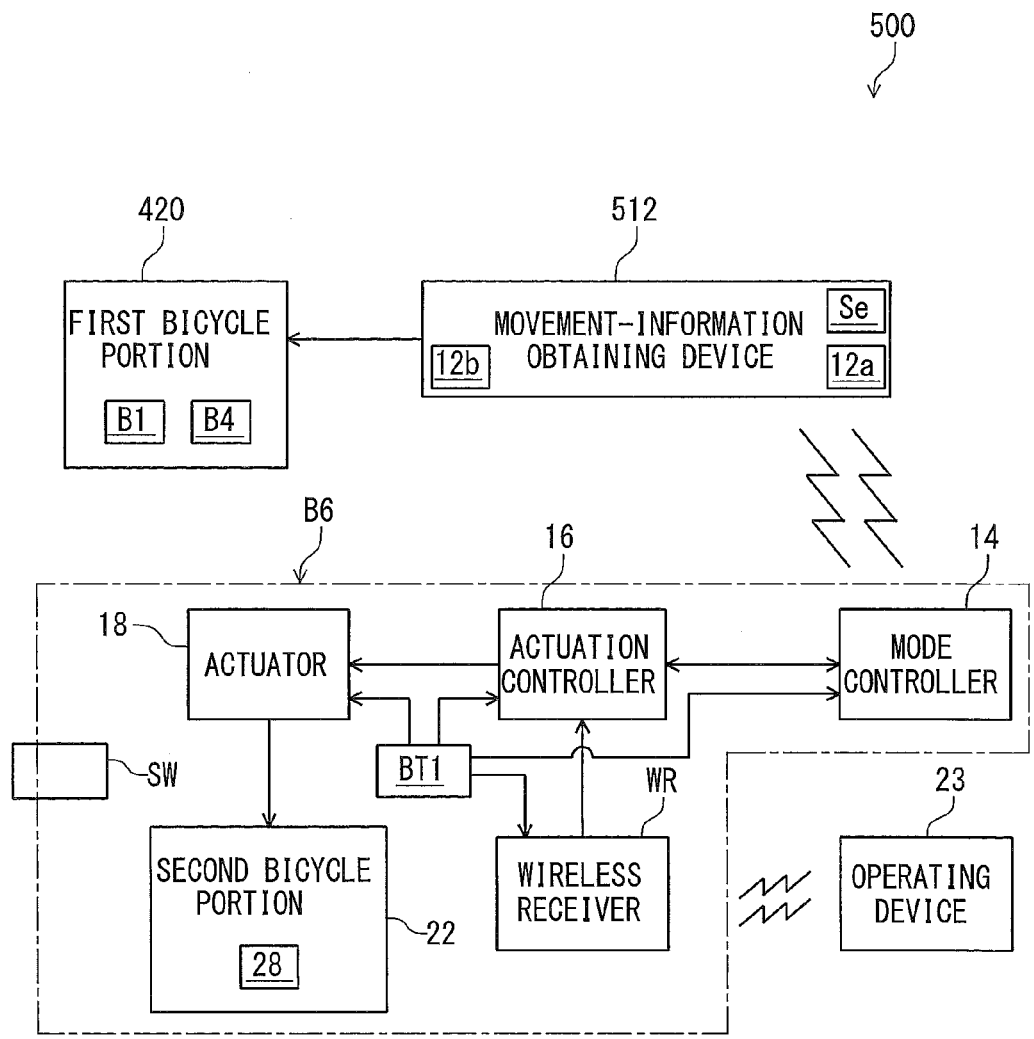
FIG. 11 is a block diagram illustrating a configuration of a control system in accordance with a fifth embodiment.

As seen in FIG. 11, the control system 500 comprises a movement-information obtaining device 512 configured to obtain movement information indicating a movement of at least part of the first bicycle portion 420. The first bicycle portion 420 includes the bicycle frame B1 and the crank assembly B4 rotatable relative to the bicycle frame B1.

The movement-information obtaining device 512 has substantially the same configuration as that of the movement-information obtaining device 412. In this embodiment, however, the movement-information obtaining device 512 is configured to sense a pedaling force applied to the crank assembly B4 to obtain the movement information.

Figure 12:
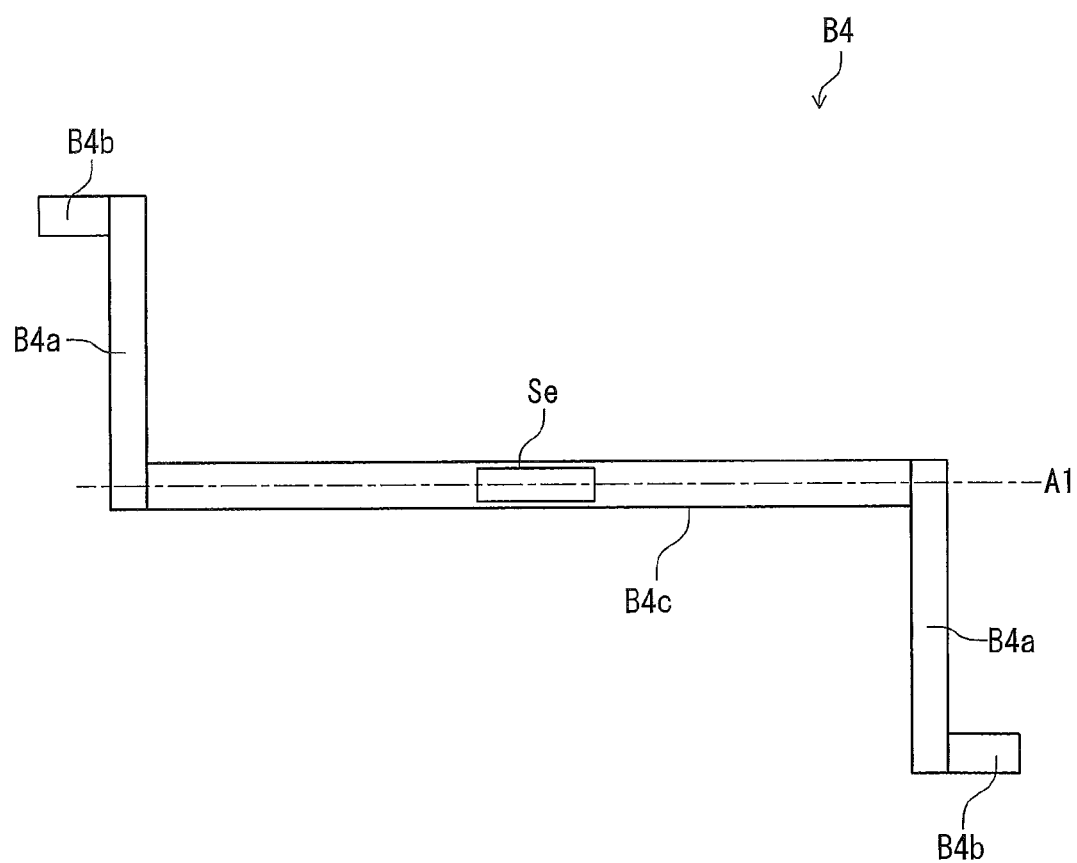
FIG. 12 is an enlarged view of a crank assembly viewed from above.

FIG. 12 is a schematic view of the crank assembly B4. The crank assembly B4 includes the crank arms B4a, pedals B4b, and a crank shaft B4c. The crank shaft B4c extends along a rotational axis A1 of the crank assembly B4. The crank shaft B4c is supported rotatably relative to the bicycle frame B1. The crank arms B4a are respectively secured to axial ends of the crank shaft B4c. The pedals B4b are rotatably attached to the crank arms B4a, respectively.

For example, the movement-information obtaining device 512 includes a torque sensor Se. As shown in FIG. 12, the torque sensor Se is attached to the crank shaft B4c. For example, the torque sensor Se includes a strain gauge attached to the crank shaft B4c. The torque sensor Se can be other sensors such as a magnetostrictive sensor. When the user pedals the bicycle 1, the crank assembly B4 rotates relative to the bicycle frame B1, and the pedaling force is applied to the crank assembly B4. In other words, the pedaling torque is applied to the crank shaft B4c due to the pedaling force of the crank assembly B4. Therefore, the torque sensor Se obtains the movement information indicating the movement of a part (i.e., the crank assembly B4) of the first bicycle portion 420. The wireless transmitter 12a is configured to wirelessly transmit the movement information sensed by the torque sensor Se to the mode controller 14. The wireless transmitter 12a is attached to the crank shaft B4c along with the torque sensor Se, for example. The torque sensor Se can be attached to the crank shafts B4a and the pedals B4b.

An operation of the control system 500 in accordance with this embodiment is substantially the same operation of the control system 100 in accordance with first embodiment (see FIG. 7). In this embodiment, however, the movement-information obtaining device 512 senses the pedaling force applied to the crank assembly B4 to obtain the movement information. Namely, in the steps S4, S7, and S10 of FIG. 7, the movement-information obtaining device 512 senses the pedaling force applied to the crank assembly B4 to obtain the movement information indicating the rotation of the crank assembly B4 relative to the bicycle frame B1 when the user pedals the bicycle 1. When the movement-information obtaining device 512 obtains the movement information, the movement-information obtaining device 512 wirelessly transmits the movement information to the mode controller 14.

With the control system 500, the actuation controller 16 has the wake mode to control the actuator 18 based on an input signal and the sleep mode to be suspended under the electrical power consumption lower than the electrical power consumption in the wake mode. The mode controller 14 is configured to wirelessly receive the movement information and is configured to switch the actuation controller 16 from the sleep mode to the wake mode based on the movement information. Accordingly, it is possible to easily change the actuation controller 16 from the sleep mode to the wake mode by detecting the movement of at least part of the first bicycle portion 420.

Sixth Embodiment

Figure 13:
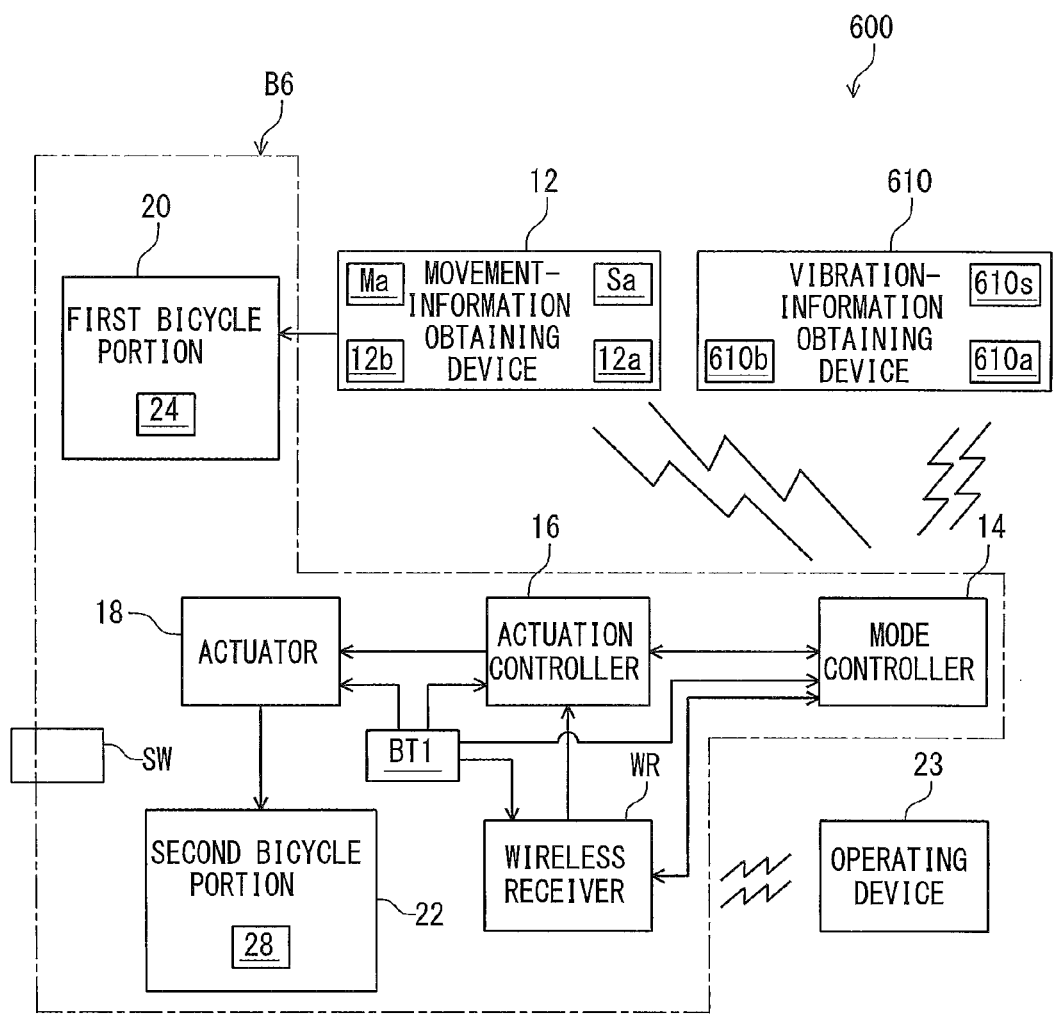
FIG. 13 is a block diagram illustrating a configuration of a bicycle shifting system in accordance with a sixth embodiment.

FIG. 13 is a block diagram illustrating a configuration of the control system 600 in accordance with this embodiment. As shown in FIG. 13, the control system 600 further comprises a vibration-information obtaining device 610. As seen from comparing FIGS. 2 and 13, the control system 600 has the same configuration as the configuration of the control system 100, except that the vibration-information obtaining device 610 is additionally provided. Thus, elements having substantially the same function as those in the first embodiment will be numbered the same here, and will not be described and/or illustrated again in detail here for the sake of brevity.

The vibration-information obtaining device 610 is operatively connected to the mode controller 14. Specifically, the vibration-information obtaining device 610 is wirelessly connected to the mode controller 14.

The vibration-information obtaining device 610 is configured to obtain vibration information. The vibration information indicates a vibration of the bicycle 1. The vibration-information obtaining device 610 includes a vibration sensor 610s configured to sense the vibration of the bicycle 1. Therefore, the vibration-information obtaining device 610 detects the vibration of the bicycle 1 through the vibration sensor 610s to obtain vibration information. The vibration-information obtaining device 610 is mounted on the bicycle 1. The vibration-information obtaining device 610 can be provided in the shifting device B6.

In this embodiment, the mode controller 14 is configured to wirelessly receive the movement information and the vibration information. The mode controller 14 is configured to switch the actuation controller 16 from the sleep mode to the wake mode based on the movement information and the vibration information.

For example, the vibration-information obtaining device 610 is configured to wirelessly transmit carrier wave to the mode controller 14. Specifically, the vibration-information obtaining device 610 includes a wireless transmitter 610a configured to wirelessly transmit the carrier wave to the mode controller 14. The carrier wave includes the vibration information. As shown in FIG. 3, the mode controller 14 includes the detector circuit 14a configured to detect the carrier wave. The mode controller 14 is configured to switch the actuation controller 16 from the sleep mode to the wake mode in response to detection of the vibration information included in the carrier wave. The detector circuit 14a serves as a wireless receiver configured to establish a wireless communication with the wireless transmitter 610a of the vibration-information obtaining device 610. The vibration-information obtaining device 610 can be electrically connected to the mode controller 14 through a signal line such as a wire and a cable.

The vibration-information obtaining device 610 includes a battery 610b provided separately from the battery BT1.

An operation of the control system 600 in accordance with this embodiment is substantially the same operation of the control system 100 in accordance with first embodiment (see FIG. 7). In this embodiment, however, the steps S7 and S10 of FIG. 7 have the following operations.

When the mode controller 14 wirelessly receives both of the movement information and the vibration information in the light sleep mode, the mode controller 14 switches the actuation controller 16 from the sleep mode (the light sleep mode) to the wake mode based on the movement information and the vibration information (steps S1 and S7).

When the mode controller 14 does not receive both the movement information and the vibration information in the light sleep mode, the mode controller 14 compares the counted non-use time period T1 with the second predetermined time period T22 (step S8).

When the mode controller 14 wirelessly does not receive both of the movement information and the vibration information in the deep sleep mode, the mode controller 14 keeps monitoring the movement information and the vibration information (step S10). When the mode controller 14 wirelessly receives both of the movement information and the vibration information in the deep sleep mode, the mode controller 14 switches the actuation controller 16 from the sleep mode (the deep sleep mode) to the wake mode (steps S1 and S10).

With the control system 600 in accordance with this embodiment, it is possible to easily change the actuation controller 16 from the sleep mode to the wake mode by detecting the movement of the part of first bicycle portion 20 and the vibration on the bicycle 1.

In the above description, the vibration-information obtaining device 610 is additionally provided in the control system 100. However, the vibration-information obtaining device 610 can be additionally provided in the control systems 200, 300, 400, and 500.

Seventh Embodiment

A control system 700 in accordance with a seventh embodiment will be described below referring to FIG. 14. The control system 700 has substantially the same configuration as the control system 100 except for elements corresponding to the mode controller 14, the first bicycle portion 20, and the movement information obtaining device 12. Thus, elements having substantially the same function as those in the first embodiment will be numbered the same here, and will not be described and/or illustrated again in detail here for the sake of brevity.

Figure 14:
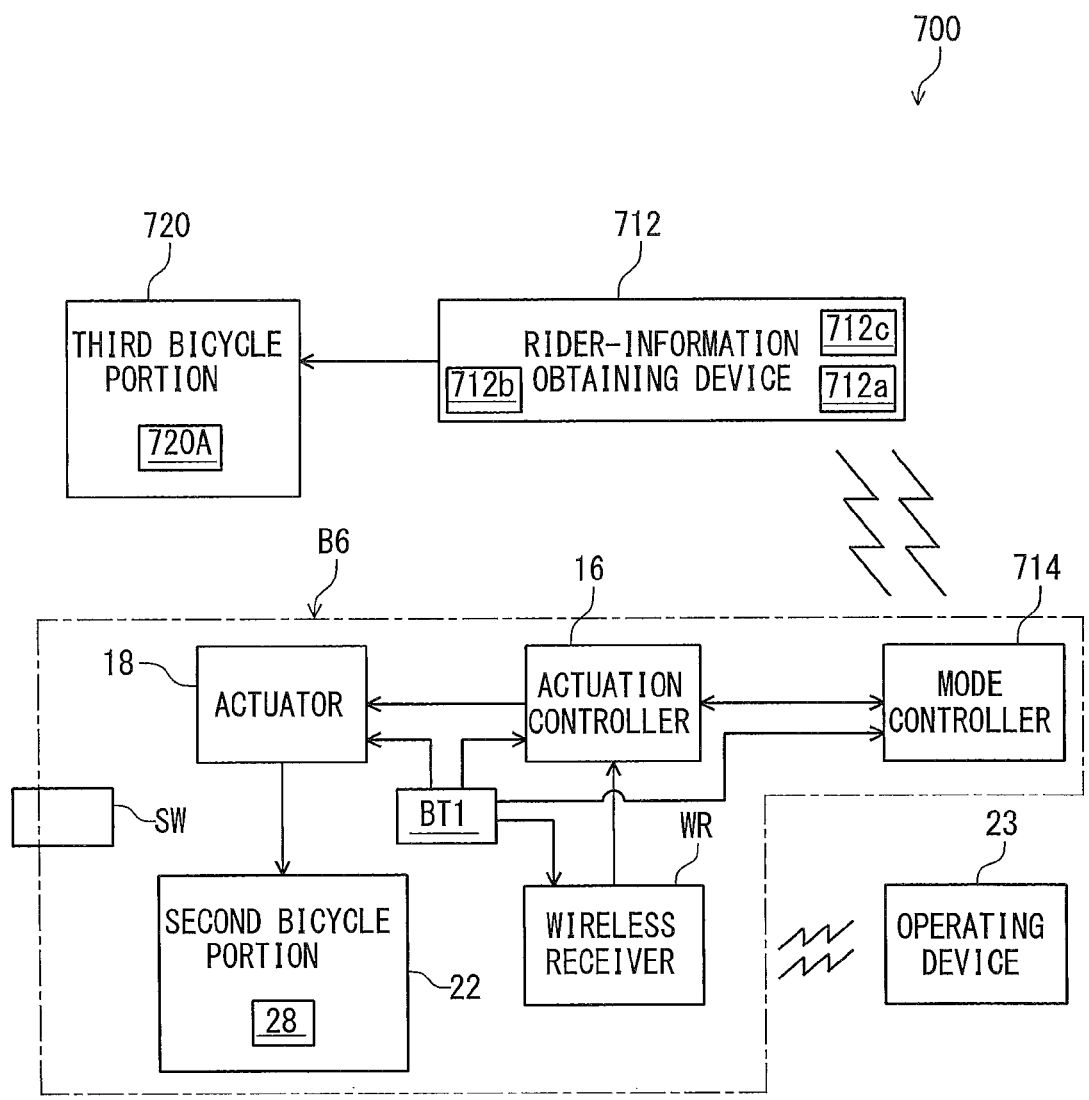
FIG. 14 is a block diagram illustrating a configuration of a bicycle shifting system in accordance with a seventh embodiment.

As shown in FIG. 14, the control system 700 comprises a rider-information obtaining device 712 and a mode controller 714. The rider-information obtaining device 712 is operatively connected to the mode controller 714. The mode controller 714 is operatively connected to the actuation controller 16. Specifically, the rider-information obtaining device 712 is wirelessly connected to the mode controller 714. The mode controller 714 is electrically connected to the actuation controller 16 via a signal line.

The rider-information obtaining device 712 is configured to obtain rider information. The rider information indicates that a rider is on the bicycle 1 from a third bicycle portion 720. The rider-information obtaining device 712 is configured to wirelessly output the rider information.

Figure 15:
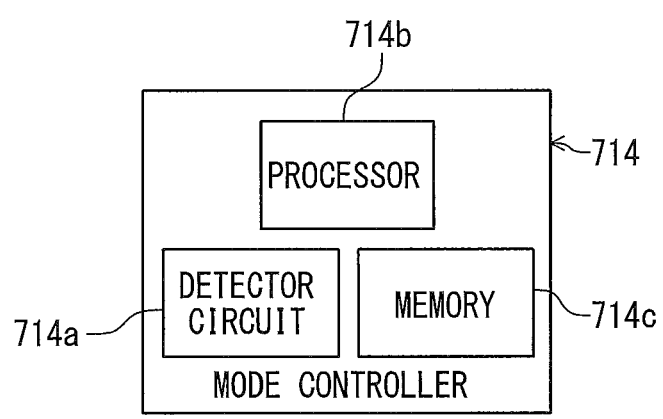
FIG. 15 is an enlarged block diagram illustrating a configuration of the mode controller and the actuation controller.

The mode controller 714 is configured to wirelessly receive the rider information. The mode controller 714 is configured to switch the actuation controller 16 from the sleep mode to the wake mode based on the rider information. For example, the rider-information obtaining device 712 is configured to wirelessly transmit carrier wave to the mode controller 714. Specifically, the rider-information obtaining device 712 includes a wireless transmitter 712a configured to wirelessly transmit the carrier wave to the mode controller 714. The carrier wave includes the rider information. As shown in FIG. 15, the mode controller 714 includes a detector circuit 714a configured to detect the carrier wave. The mode controller 714 is configured to switch the actuation controller 16 from the sleep mode to the wake mode in response to detection of the rider information included in the carrier wave. The detector circuit 714a serves as a wireless receiver configured to establish a wireless communication with the wireless transmitter 712a (FIG. 14) of the rider-information obtaining device 712.

The mode controller 714 switches the actuation controller 16 from the wake mode to the sleep mode when the mode controller 714 does not receive the rider information for a predetermined time period. In the illustrated embodiment, the mode controller 714 switches the actuation controller 16 from the wake mode to the sleep mode when the detector circuit 714a does not detect the rider information included in the carrier wave for the predetermined time period.

As seen in FIG. 15, the mode controller 714 is constituted as a microcomputer and includes a processor 714b and a memory 714c. The processor 714b includes a CPU. The memory 714c includes a ROM and a RAM. For example, a program stored in the memory 714c is read into the processor 714b, and thereby functions of the mode controller 714 are performed.

In this embodiment, the mode controller 714 and the actuation controller 16 are separately provided from each other. However, the mode controller 714 and the actuation controller 16 can be integrally provided with each other as a single controller if needed and/or desired. In this embodiment, as seen in FIG. 14, the mode controller 714 is provided in the shifting device B6.

Figure 16:
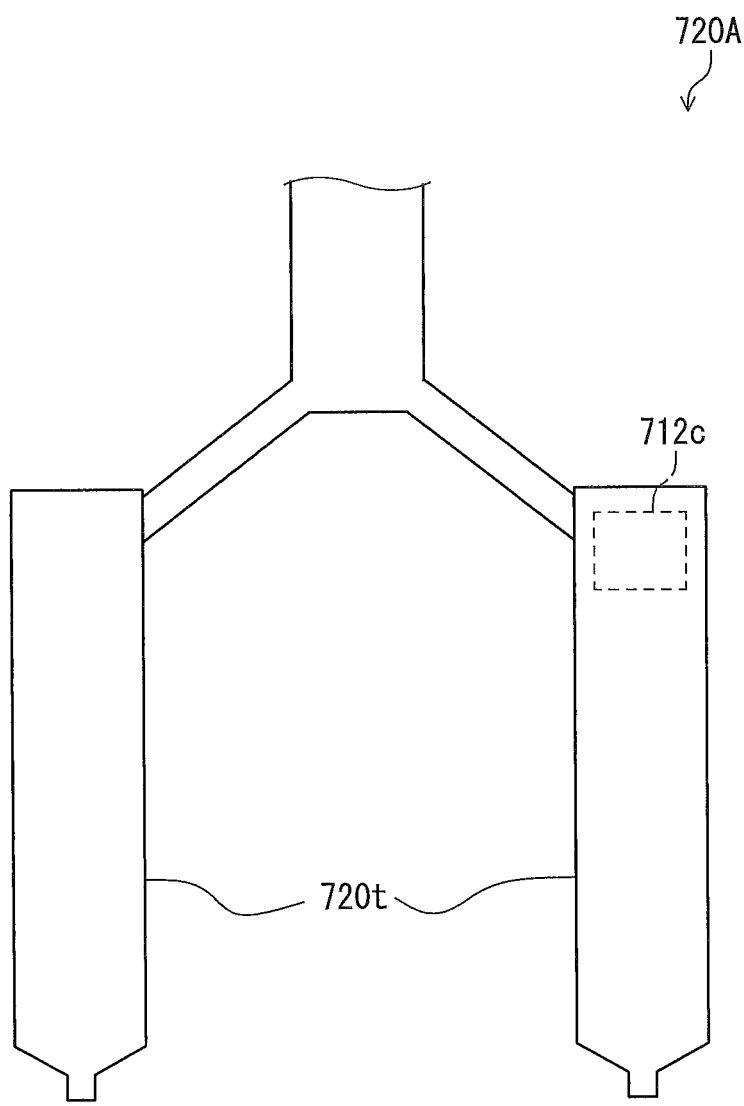
FIG. 16 is a front view illustrating a suspension.

In this embodiment, the third bicycle portion 720 includes a suspension 720A. As shown in FIG. 1, a front fork B1f is attached to the bicycle frame B1. The front wheel B3f is rotatably attached to the front fork B1f. The suspension 720A is provided in the front fork B1f. FIG. 16 is a front view illustrating the suspension 720A. The suspension 720A is configured to buffer vibration (or absorb shock) of the front wheel B3f using elastic force. Examples of the suspension 720 include a hydro-pneumatic suspension.

In this embodiment, the rider-information obtaining device 712 is configured to obtain, as the rider information, a change in pressure in the suspension 720A. The rider-information obtaining device 712 includes a first pressure sensor 712c. The first pressure sensor 712c is configured to sense the change in pressure in the suspension 720. Namely, the rider-information obtaining device 712 obtains the rider information through a detection result using the first pressure sensor 712c.

For example, the suspension 720A is the hydro-pneumatic suspension. As shown in FIG. 16, the suspension 720A has tubular elements 720t. The first pressure sensor 712c is provided inside one of the tubular elements 720t (in FIG. 16, the first pressure sensor 712c is illustrated in a dotted line). More specifically, as one example, the first pressure sensor 712c is provided inside an air spring chamber of the suspension 720A.

When the rider is on the bicycle 1, weight of the rider is applied to the bicycle 1 (including the suspension 720A). Therefore, in this embodiment, as shown in FIG. 16, the first pressure sensor 712c senses the change in pressure in the suspension 720A. The rider-information obtaining device 712 obtains the rider information by sensing the change in pressure in the suspension 720A using the first sensor 712c. Then, the rider-information obtaining device 712 wirelessly transmits the rider information to the mode controller 714

The rider-information obtaining device 712 includes a battery 712b provided separately from the battery BT1.

Figure 17:
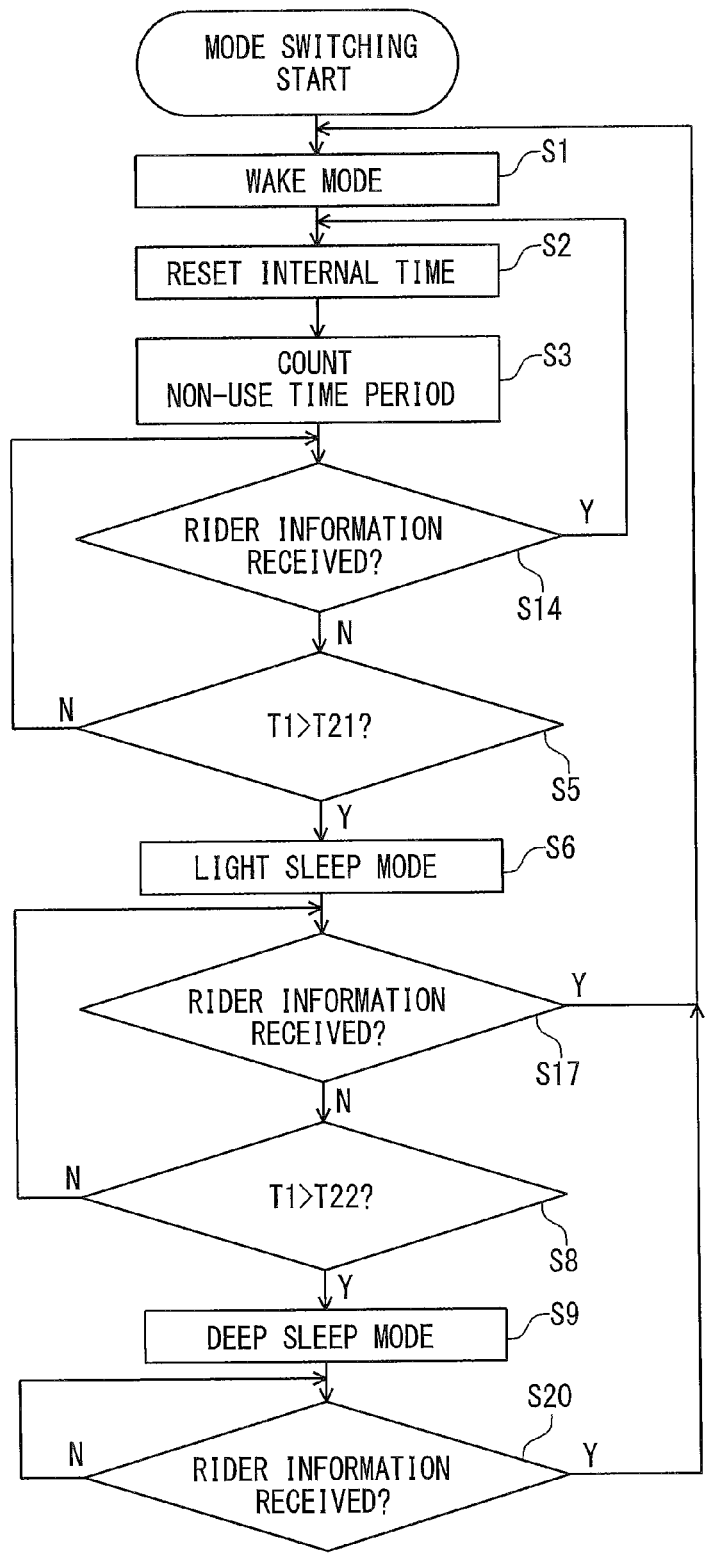
FIG. 17 is a diagram for explaining an operation of the control system in accordance with the seventh embodiment.

Next, an operation of the control system 700 in accordance with this embodiment will be described referring to FIG. 17. FIG. 17 is a flow chart showing the operation of the control system 700 in accordance with this embodiment.

As seen from comparing FIG. 7 and FIG. 17, the control system 700 has the same operation as the operation of the control system 100 except for the steps S4, S7, and S10. Thus, the steps S1, S2, S3, S5, S6, S8, and S9 will not be described in detail here for the sake of brevity.

The mode controller 714 determines whether the mode controller 714 receives the rider information from the rider-information obtaining device 712 (step S14). The rider-information obtaining device 712 obtains the rider information indicating that the rider is on the bicycle 1 from the third bicycle portion 720. In this embodiment, as shown in FIG. 14, the rider-information obtaining device 712 senses the change in pressure in the suspension 720A to obtain the rider information when the rider is on the bicycle 1. When the rider-information obtaining device 712 obtains the rider information, the rider-information obtaining device 712 wirelessly transmits the rider information to the mode controller 714.

When the mode controller 714 wirelessly receives the rider information from the rider-information obtaining device 712 in the wake mode, the mode controller 714 resets the internal timer and to restart to count the non-use time period (steps S2 and S3). When the mode controller 714 does not receive the rider information from the rider-information obtaining device 712, the mode controller 714 compares the counted non-use time period T1 with the first predetermined time period T21 (steps S14 and S5).

When the mode controller 714 wirelessly receives the rider information in the light sleep mode, the mode controller 714 switches the actuation controller 16 from the sleep mode (the light sleep mode) to the wake mode based on the rider information (steps S1 and S17).

When the mode controller 714 does not receive the rider information in the light sleep mode, the mode controller 714 compares the counted non-use time period T1 with the second predetermined time period T22 (step S8).

When the mode controller 714 does not receive the rider information in the deep sleep mode, the mode controller 714 keeps monitoring the rider information (step S20). When the mode controller 714 wirelessly receives the rider information in the deep sleep mode, the mode controller 714 switches the actuation controller 16 from the sleep mode (the deep sleep mode) to the wake mode (steps S1 and S20).

With the control system 700, the actuation controller 16 has the wake mode to control the actuator 18 based on an input signal and the sleep mode to be suspended under the electrical power consumption lower than the electrical power consumption in the wake mode. The mode controller 714 is configured to wirelessly receive the rider information and is configured to switch the actuation controller 16 from the sleep mode to the wake mode based on the rider information. Accordingly, it is possible to easily change the actuation controller 16 from the sleep mode to the wake mode by detecting that rider is on the bicycle 1 through the third bicycle portion 720.

Eighth Embodiment

A control system 800 in accordance with an eighth embodiment will be described below referring to FIG. 18. The control system 800 has substantially the same configuration as the control system 700 except for elements corresponding to the third bicycle portion 720 and the rider-information obtaining device 712. Thus, elements having substantially the same function as those in the first embodiment will be numbered the same here, and will not be described and/or illustrated again in detail here for the sake of brevity.

Figure 18:
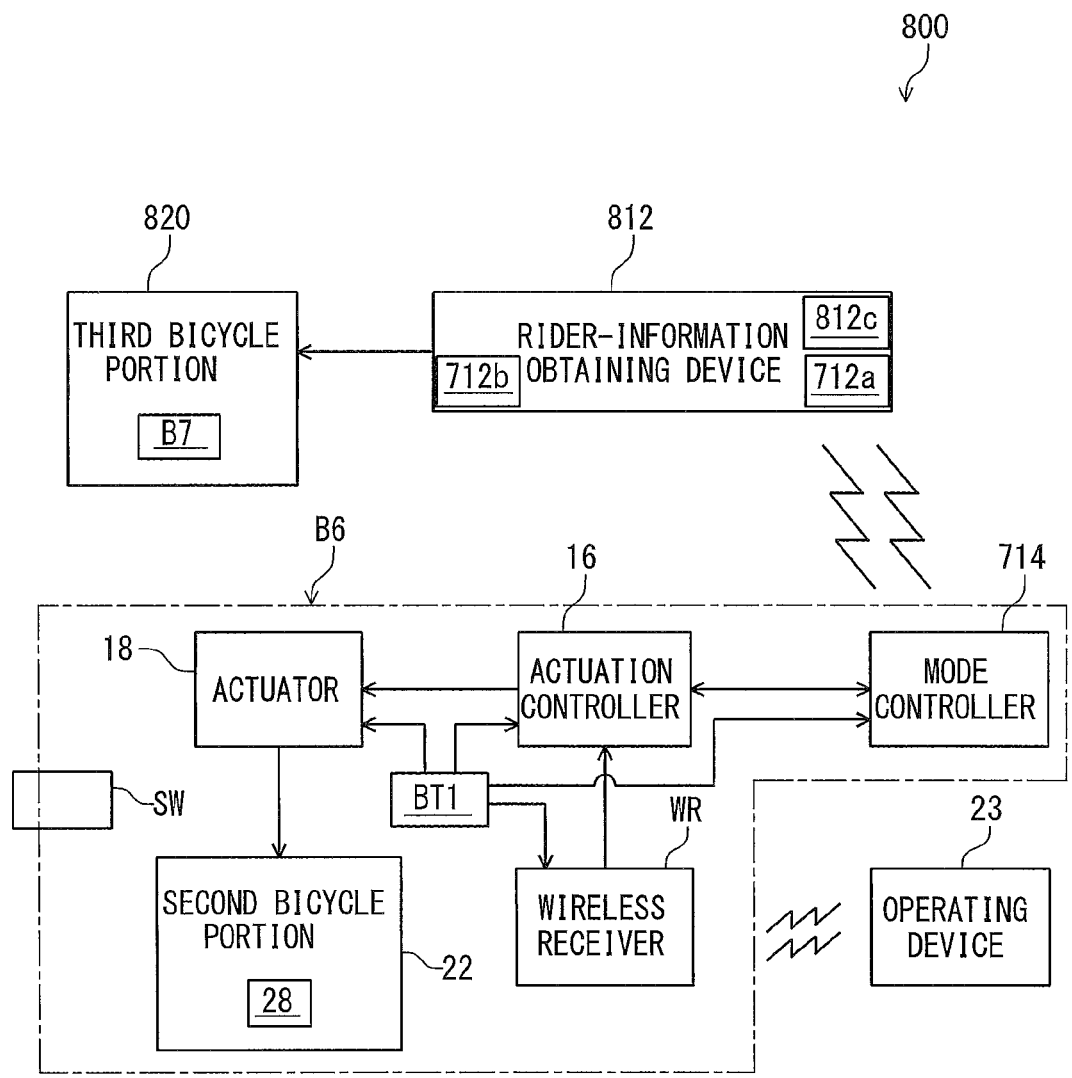
FIG. 18 is a block diagram illustrating a configuration of a control system in accordance with an eighth embodiment.

As seen in FIG. 18, the control system 800 comprises a rider-information obtaining device 812 configured to obtain rider information indicating that the rider is on the bicycle 1 from a third bicycle portion 820. In the illustrated embodiment, the third bicycle portion 820 includes the seatpost B7.

The rider-information obtaining device 812 has substantially the same configuration as that of the rider-information obtaining device 712. In this embodiment, however, the rider-information obtaining device 812 is configured to obtain, as the rider information, a change in pressure in the seatpost B7.

For example, the rider-information obtaining device 812 includes a second pressure sensor 812c. The second pressure sensor 812c is provided in the seatpost B7. The second pressure sensor 812c is configured to sense the change in pressure in the seatpost B7. Namely, the rider-information obtaining device 812 obtains the rider information through a detection result using the second pressure sensor 812c.

Figure 19:
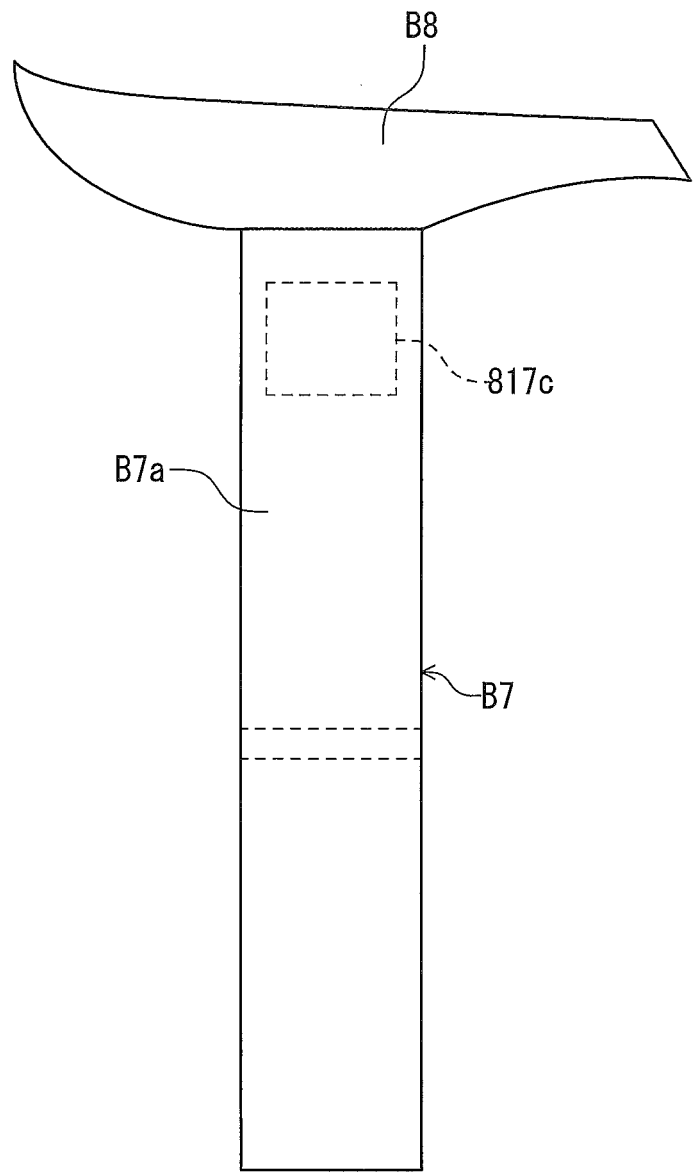
FIG. 19 is a side view illustrating a seatpost.

For example, the seatpost B7 is an adjustable seatpost hydraulically operated in order to adjust the height of the saddle B8 via a seatpost operating device (not shown). FIG. 19 is a side view illustrating the seatpost B7. As shown in FIG. 19, the seatpost B7 has a fluid chamber B7a. The second pressure sensor 812c is provided inside the fluid chamber B7a (in FIG. 19, the second pressure sensor 812c is illustrated in a dotted line).

When the rider is on the bicycle 1, weight of the rider is applied to the bicycle 1 (including the seatpost B7 through the saddle B8). Therefore, in this embodiment, as shown in FIG. 19, the second pressure sensor 812c senses the change in pressure in the seatpost B7. The rider-information obtaining device 812 obtains the rider information by sensing the change in pressure in the seatpost B7 using the second pressure sensor 812c. Then, the rider-information obtaining device 812 wirelessly transmits the rider information to the mode controller 714.

An operation of the control system 800 in accordance with this embodiment is substantially the same operation of the control system 700 in accordance with seventh embodiment (see FIG. 17). In this embodiment, however, the rider-information obtaining device 812 obtains the change in pressure in the seatpost B7, as the rider information. Namely, in the steps S14, S17, and S20 of FIG. 17, the rider-information obtaining device 812 senses the change in pressure in the seatpost B7 to obtain the rider information indicating that the rider is on the bicycle 1 from the seatpost B7. When the rider-information obtaining device 812 obtains the rider information, the rider-information obtaining device 812 wirelessly transmits the rider information to the mode controller 714.

With the control system 800, the actuation controller 16 has the wake mode to control the actuator 18 based on an input signal and the sleep mode to be suspended under the electrical power consumption lower than the electrical power consumption in the wake mode. The mode controller 714 is configured to wirelessly receive the rider information and is configured to switch the actuation controller 16 from the sleep mode to the wake mode based on the rider information. Accordingly, it is possible to easily change the actuation controller 16 from the sleep mode to the wake mode by detecting that rider is on the bicycle 1 through the third bicycle portion 820.

Ninth Embodiment

Figure 20:
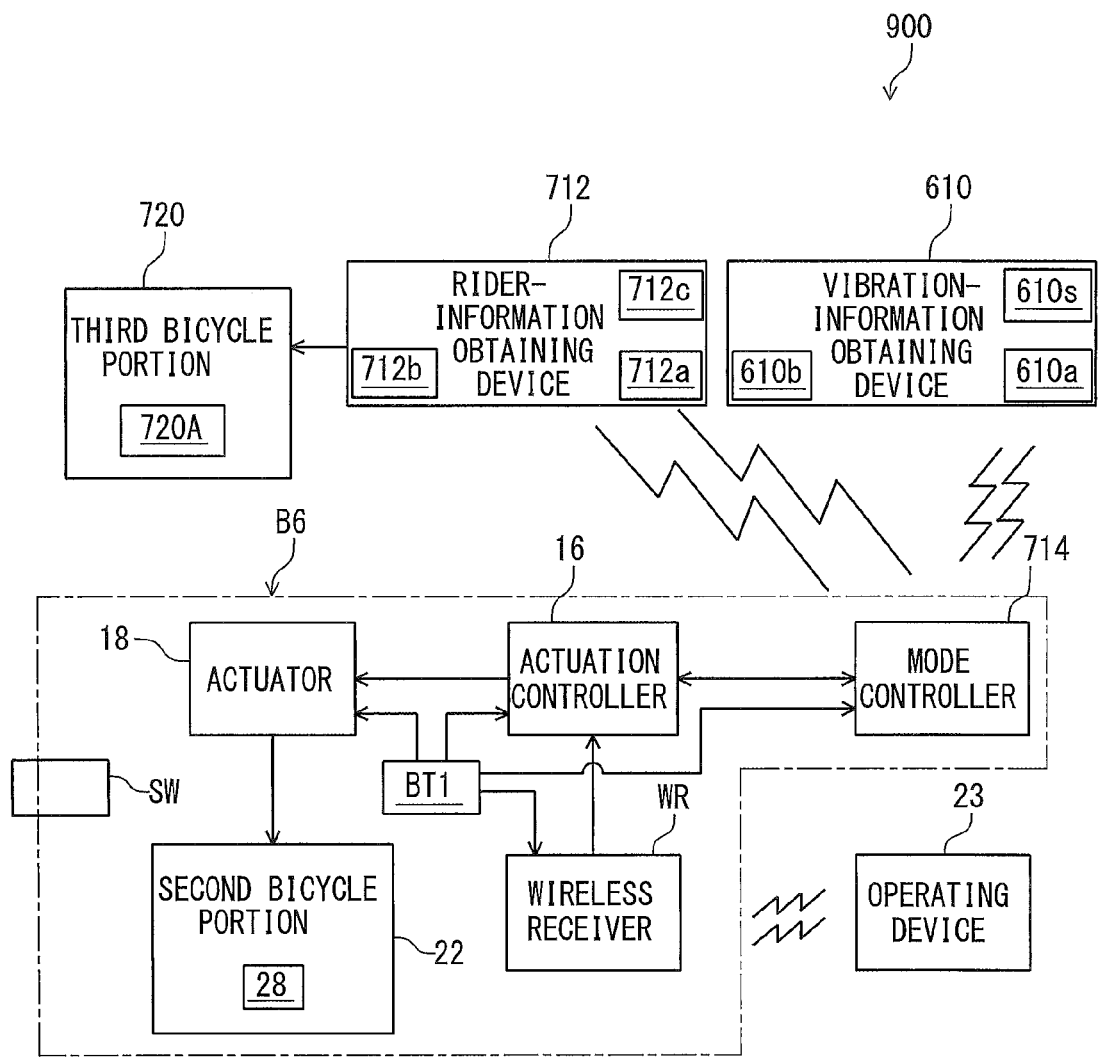
FIG. 20 is a block diagram illustrating a configuration of a control system in accordance with a ninth embodiment.

FIG. 20 is a block diagram illustrating a configuration of the control system 900 in accordance with this embodiment. As shown in FIG. 20, the control system 900 further comprises the vibration-information obtaining device 610. As seen from comparing FIGS. 14 and 20, the control system 900 has the same configuration as the configuration of the control system 700, except that the vibration-information obtaining device 610 is additionally provided. Thus, elements having substantially the same function as those in the seventh embodiment will be numbered the same here, and will not be described and/or illustrated again in detail here for the sake of brevity.

The vibration-information obtaining device 610 is operatively connected to the mode controller 714. Specifically, the vibration-information obtaining device 610 is wirelessly connected to the mode controller 714.

The vibration-information obtaining device 610 is configured to obtain the vibration information. The vibration information indicates the vibration of the bicycle 1. A configuration of the vibration-information obtaining device 610 in accordance with this embodiment is the same as the configuration of the vibration-information obtaining device 610 in accordance with sixth embodiment.

In this embodiment, the mode controller 714 is configured to wirelessly receive the rider information and the vibration information. The mode controller 714 is configured to switch the actuation controller 16 from the sleep mode to the wake mode based on the rider information and the vibration information.

As shown in FIG. 15, the mode controller 714 includes the detector circuit 714a configured to detect the carrier wave. The mode controller 714 is configured to switch the actuation controller 16 from the sleep mode to the wake mode in response to detection of the vibration information included in the carrier wave. The detector circuit 714a serves as a wireless receiver configured to establish a wireless communication with the wireless transmitter 610a of the vibration-information obtaining device 610. The vibration-information obtaining device 610 can be electrically connected to the mode controller 714 through a signal line such as a wire and a cable.

An operation of the control system 900 in accordance with this embodiment is substantially the same operation of the control system 700 in accordance with seventh embodiment (see FIG. 17). In this embodiment, however, the steps S17 and S20 of FIG. 17 have the following operations.

When the mode controller 714 wirelessly receives both of the rider information and the vibration information in the light sleep mode, the mode controller 714 switches the actuation controller 16 from the sleep mode (the light sleep mode) to the wake mode based on the rider information and the vibration information (steps S1 and S17).

When the mode controller 714 does not receive both the rider information and the vibration information in the light sleep mode, the mode controller 714 compares the counted non-use time period T1 with the second predetermined time period T22 (step S8).

When the mode controller 714 wirelessly does not receive both of the rider information and the vibration information in the deep sleep mode, the mode controller 714 keeps monitoring the rider information and the vibration information (step S20). When the mode controller 714 wirelessly receives both of the rider information and the vibration information in the deep sleep mode, the mode controller 714 switches the actuation controller 16 from the sleep mode (the deep sleep mode) to the wake mode (steps S1 and S20).

With the control system 900 in accordance with this embodiment, it is possible to easily change the actuation controller 16 from the sleep mode to the wake mode by detecting the riding on the bicycle 1 through the third bicycle portion 720 and the vibration on the bicycle 1.

In the above description, the vibration-information obtaining device 610 is additionally provided in the control system 700. However, the vibration-information obtaining device 610 can be additionally provided in the control system 800 in accordance with the eighth embodiment.

Tenth Embodiment

Figure 21:
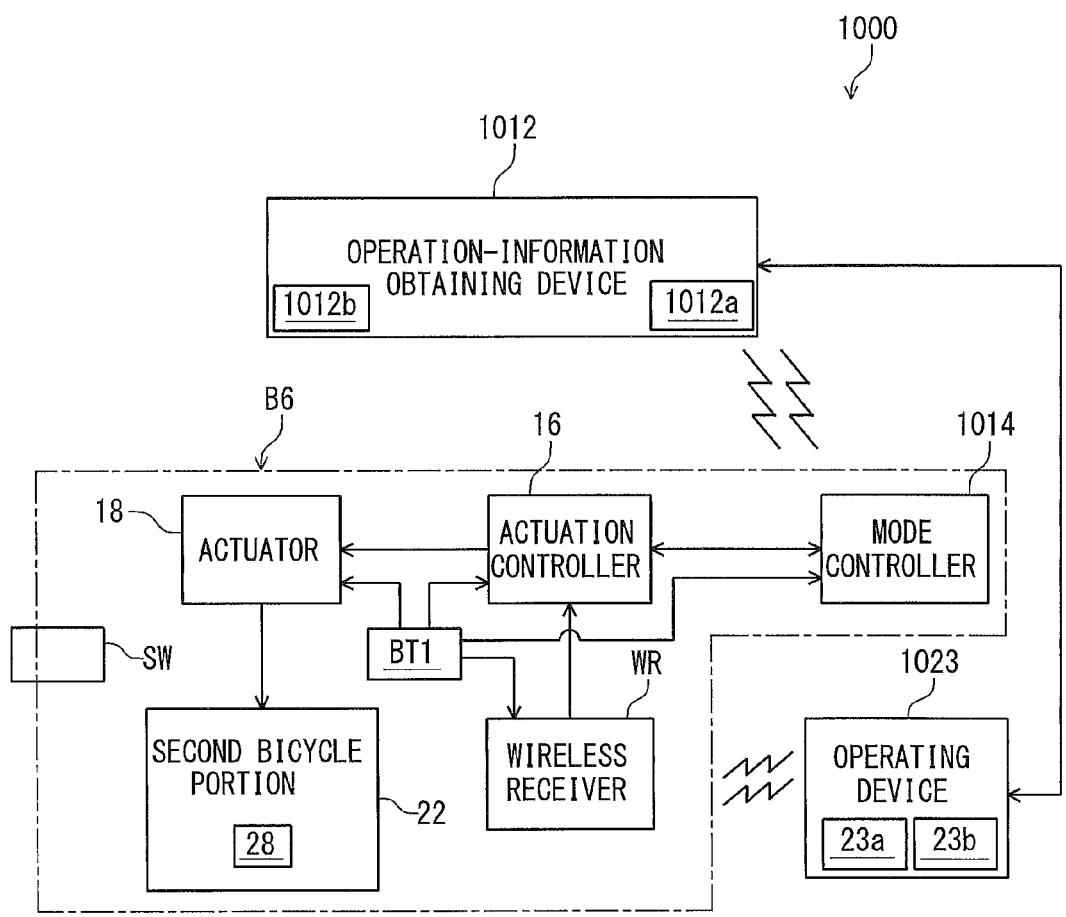
FIG. 21 is a block diagram illustrating a configuration of a control system in accordance with a tenth embodiment.

A control system 1000 in accordance with a tenth embodiment will be described below referring to FIG. 21. The control system 1000 has substantially the same configuration as the control system 100 except for some elements corresponding to the mode controller 14, the movement information obtaining device 12, and the operating device 23. Thus, elements having substantially the same function as those in the first embodiment will be numbered the same here, and will not be described and/or illustrated again in detail here for the sake of brevity. In FIG. 21, illustration of the first bicycle portion 20 is omitted for simplification.

As shown in FIG. 21, the control system 1000 comprises an operation-information obtaining device 1012 and mode controller 1014. The operation-information obtaining device 1012 is operatively connected to the mode controller 1014. The mode controller 1014 is operatively connected to the actuation controller 16. Specifically, the operation-information obtaining device 1012 is wirelessly connected to the mode controller 1014. The mode controller 1014 is electrically connected to the actuation controller 16 via a signal line.

The operation-information obtaining device 1012 is configured to obtain operation information. The operation information indicates that a user operates an input part of an operating device 1023. The operation-information obtaining device 1012 is configured to wirelessly output the operation information.

The control system 1000 further comprises the operating device 1023. The operating device 1023 is mounted on the bicycle 1. The operating device 1023 is a device that exerts various functions related to the bicycle 1. The operating device 1023 is electrically connected to the operation-information obtaining device 1012 via a signal line, and is wirelessly connected to the wireless receiver WR. The operating device 1023 can be a cycle computer, a touch panel device, a switching device (including, a physical switch such as a mechanical switch).

In this embodiment, the operating device 1023 receives the gear shifting operation from the user as described in the first embodiment (see the description of the operating device 23). The operating device 1023 has the input part that receives users operation. As seen in FIG. 21, the operating device 1023 includes the upshifting switch 23a and the downshifting switch 23b. The upshifting switch 23a can also be referred to as the input part 23a. The downshifting switch 23b can also be referred to as the input part 23b. As seen in FIG. 21, the operating device 1023 configured to receive the input operation from the user and is configured to wirelessly transmit the input signal to the shifting device B6 in response to the input operation.

Figure 22:
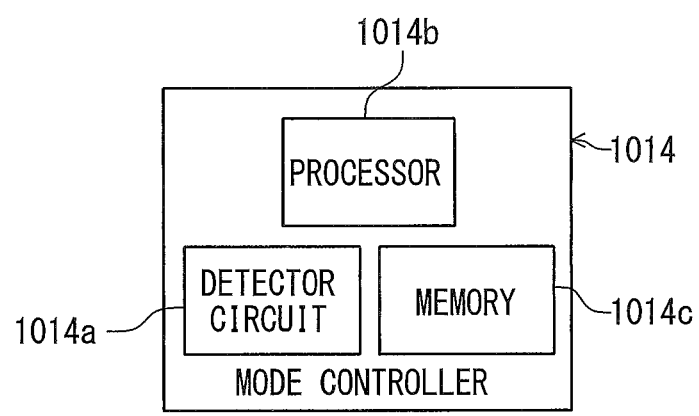
FIG. 22 is an enlarged block diagram illustrating a configuration of the mode controller and the actuation controller.

The mode controller 1014 is configured to wirelessly receive the operation information. The mode controller 1014 is configured to switch the actuation controller 16 from the sleep mode to the wake mode based on the operation information. For example, the operation-information obtaining device 1012 is configured to wirelessly transmit carrier wave to the mode controller 1014. Specifically, the operation-information obtaining device 1012 includes a wireless transmitter 1012a configured to wirelessly transmit the carrier wave to the mode controller 1014. The carrier wave includes the operation information. As shown in FIG. 22, the mode controller 1014 includes a detector circuit 1014a configured to detect the carrier wave. The mode controller 1014 is configured to switch the actuation controller 16 from the sleep mode to the wake mode in response to detection of the operation information included in the carrier wave. The detector circuit 1014a serves as a wireless receiver configured to establish a wireless communication with the wireless transmitter 1012a (FIG. 21) of the operation-information obtaining device 1012.

The mode controller 1014 switches the actuation controller 16 from the wake mode to the sleep mode when the mode controller 1014 does not receive the operation information for a predetermined time period. In the illustrated embodiment, the mode controller 1014 switches the actuation controller 16 from the wake mode to the sleep mode when the detector circuit 1014a does not detect the operation information included in the carrier wave for the predetermined time period.

As seen in FIG. 22, the mode controller 1014 is constituted as a microcomputer and includes a processor 1014b and a memory 1014c. The processor 1014b includes a CPU. The memory 1014c includes a ROM and a RAM. For example, a program stored in the memory 1014c is read into the processor 1014b, and thereby functions of the mode controller 1014 are performed.

In this embodiment, the mode controller 1014 and the actuation controller 16 are separately provided from each other. However, the mode controller 1014 and the actuation controller 16 can be integrally provided with each other as a single controller if needed and/or desired. In this embodiment, as seen in FIG. 21, the mode controller 1014 is provided in the shifting device B6.

In this embodiment, the operation-information obtaining device 1012 is configured to monitor user's operation on the input parts 23a and 23b of the operating device 1023 to obtain the operation information. When one of the input parts 23a and 23b receives the user's operation, the operation-information obtaining device 1012 detects the user's operation and obtains the operation information. Then, the operation-information obtaining device 1012 wirelessly transmits the operation information to the mode controller 1014.

The operation-information obtaining device 1012 includes a battery 1012b provided separately from the battery BT1.

Figure 23:
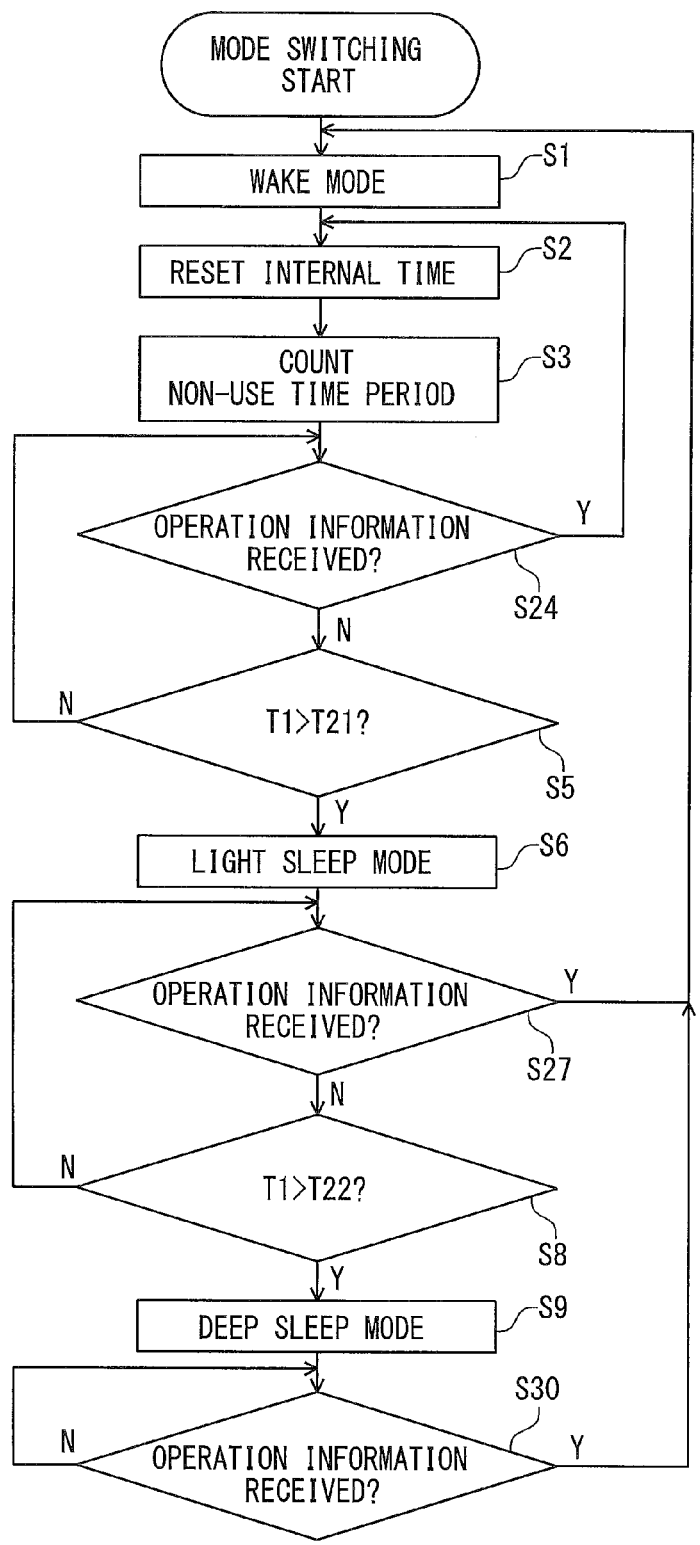
FIG. 23 is a diagram for explaining an operation of the control system in accordance with the tenth embodiment.

Next, an operation of the control system 1000 in accordance with this embodiment will be described referring to FIG. 23. FIG. 23 is a flow chart showing the operation of the control system 1000 in accordance with this embodiment.

As seen in FIG. 23, the control system 1000 has the same operation as the operation of the control system 100 except for the steps S4, S7, and S10 of FIG. 7. Thus, the steps S1, S2, S3, S5, S6, S8, and S9 will not be described in detail here for the sake of brevity.

The mode controller 1014 determines whether the mode controller 1014 receives the operation information from the operation-information obtaining device 1012 (step S24). The operation-information obtaining device 1012 obtains the operation information indicating that the user operates one of the input parts 23a and 23b of the operating device 1023. In this embodiment, the operation-information obtaining device 1012 periodically senses the user's operation on one of the input parts 23a and 23b to obtain the operation information when the input parts 23a, 23b receives the user's operation. When the operation-information obtaining device 1012 obtains the operation information, the operation-information obtaining device 1012 wirelessly transmits the operation information to the mode controller 1014.

When the mode controller 1014 wirelessly receives the operation information from the operation-information obtaining device 1012 in the wake mode, the mode controller 1014 resets the internal timer and to restart to count the non-use time period (steps S2 and S3). When the mode controller 1014 does not receive the operation information from the operation-information obtaining device 1012, the mode controller 1014 compares the counted non-use time period T1 with the first predetermined time period T21 (steps S24 and S5).

When the mode controller 1014 wirelessly receives the operation information in the light sleep mode, the mode controller 1014 switches the actuation controller 16 from the sleep mode (the light sleep mode) to the wake mode based on the operation information (steps S1 and S27).

When the mode controller 1014 does not receive the operation information in the light sleep mode, the mode controller 1014 compares the counted non-use time period T1 with the second predetermined time period T22 (step S8).

When the mode controller 1014 does not receive the operation information in the deep sleep mode, the mode controller 1014 keeps monitoring the operation information (step S30). When the mode controller 1014 wirelessly receives the operation information in the deep sleep mode, the mode controller 1014 switches the actuation controller 16 from the sleep mode (the deep sleep mode) to the wake mode (steps S1 and S30).

With the control system 1000, the actuation controller 16 has the wake mode to control the actuator 18 based on an input signal and the sleep mode to be suspended under the electrical power consumption lower than the electrical power consumption in the wake mode. The mode controller 1014 is configured to wirelessly receive the rider information and is configured to switch the actuation controller 16 from the sleep mode to the wake mode based on the operation information. Accordingly, it is possible to easily change the actuation controller 16 from the sleep mode to the wake mode by detecting that the user operates one of the input parts 23a and 23b of the operating device 1023.

Eleventh Embodiment

Figure 24:
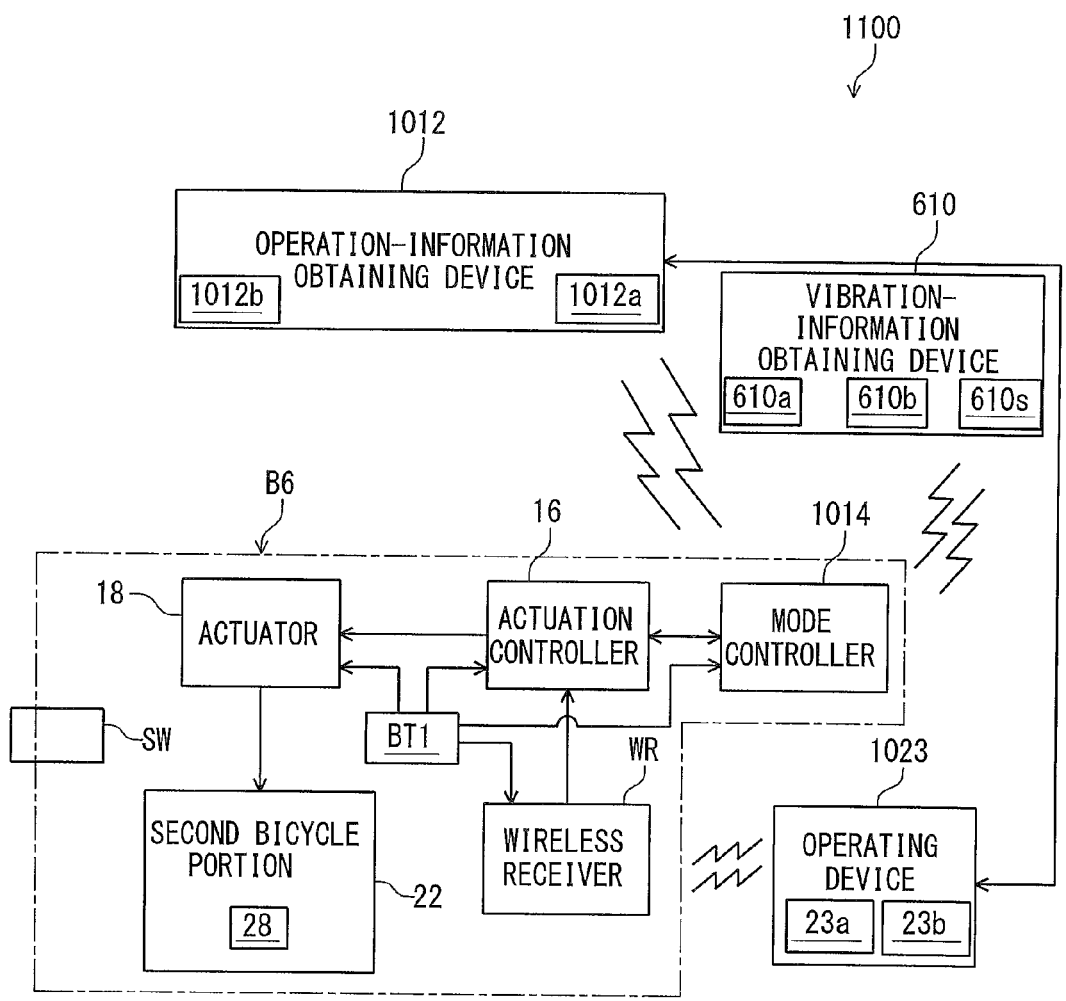
FIG. 24 is a block diagram illustrating a configuration of a control system in accordance with an eleventh embodiment.

FIG. 24 is a block diagram illustrating a configuration of the control system 1100 in accordance with this embodiment. As shown in FIG. 24, the control system 1100 further comprises a vibration-information obtaining device 610. As seen in FIG. 24, the control system 1100 has the same configuration as the configuration of the control system 1000, except that the vibration-information obtaining device 610 is additionally provided. Thus, elements having substantially the same function as those in the tenth embodiment will be numbered the same here, and will not be described and/or illustrated again in detail here for the sake of brevity.

The vibration-information obtaining device 610 is operatively connected to the mode controller 1014. Specifically, the vibration-information obtaining device 610 is wirelessly connected to the mode controller 1014.

The vibration-information obtaining device 610 is configured to obtain the vibration information. The vibration information indicates the vibration of the bicycle 1. A configuration of the vibration-information obtaining device 610 in accordance with this embodiment is the same as the configuration of the vibration-information obtaining device 610 in accordance with sixth embodiment.

In this embodiment, the mode controller 1014 is configured to wirelessly receive the operation information and the vibration information. The mode controller 1014 is configured to switch the actuation controller 16 from the sleep mode to the wake mode based on the operation information and the vibration information.

As shown in FIG. 22, the mode controller 1014 includes the detector circuit 1014a configured to detect the carrier wave. The mode controller 1014 is configured to switch the actuation controller 16 from the sleep mode to the wake mode in response to detection of the vibration information included in the carrier wave. The detector circuit 1014a serves as a wireless receiver configured to establish a wireless communication with the wireless transmitter 610a of the vibration-information obtaining device 610. The vibration-information obtaining device 610 can be electrically connected to the mode controller 1014 through a signal line such as a wire and a cable.

An operation of the control system 1100 in accordance with this embodiment is substantially the same operation of the control system 1000 in accordance with seventh embodiment (see FIG. 23). In this embodiment, however, the steps S27 and S30 of FIG. 23 have the following operations.

When the mode controller 1014 wirelessly receives both of the operation information and the vibration information in the light sleep mode, the mode controller 1014 switches the actuation controller 16 from the sleep mode (the light sleep mode) to the wake mode based on the operation information and the vibration information (steps S1 and S27).

When the mode controller 1014 does not receive both of the operation information and the vibration information in the light sleep mode, the mode controller 1014 compares the counted non-use time period T1 with the second predetermined time period T22 (step S8).

When the mode controller 1014 wirelessly does not receive both of the operation information and the vibration information in the deep sleep mode, the mode controller 1014 keeps monitoring the operation information and the vibration information (step S30). When the mode controller 1014 wirelessly receives both of the operation information and the vibration information in the deep sleep mode, the mode controller 1014 switches the actuation controller 16 from the sleep mode (the deep sleep mode) to the wake mode (steps S1 and S30).

With the control system 1100 in accordance with this embodiment, it is possible to easily change the actuation controller 16 from the sleep mode to the wake mode by detecting the user's operation on the operating device 1023 and the vibration on the bicycle 1.

Figure 25:
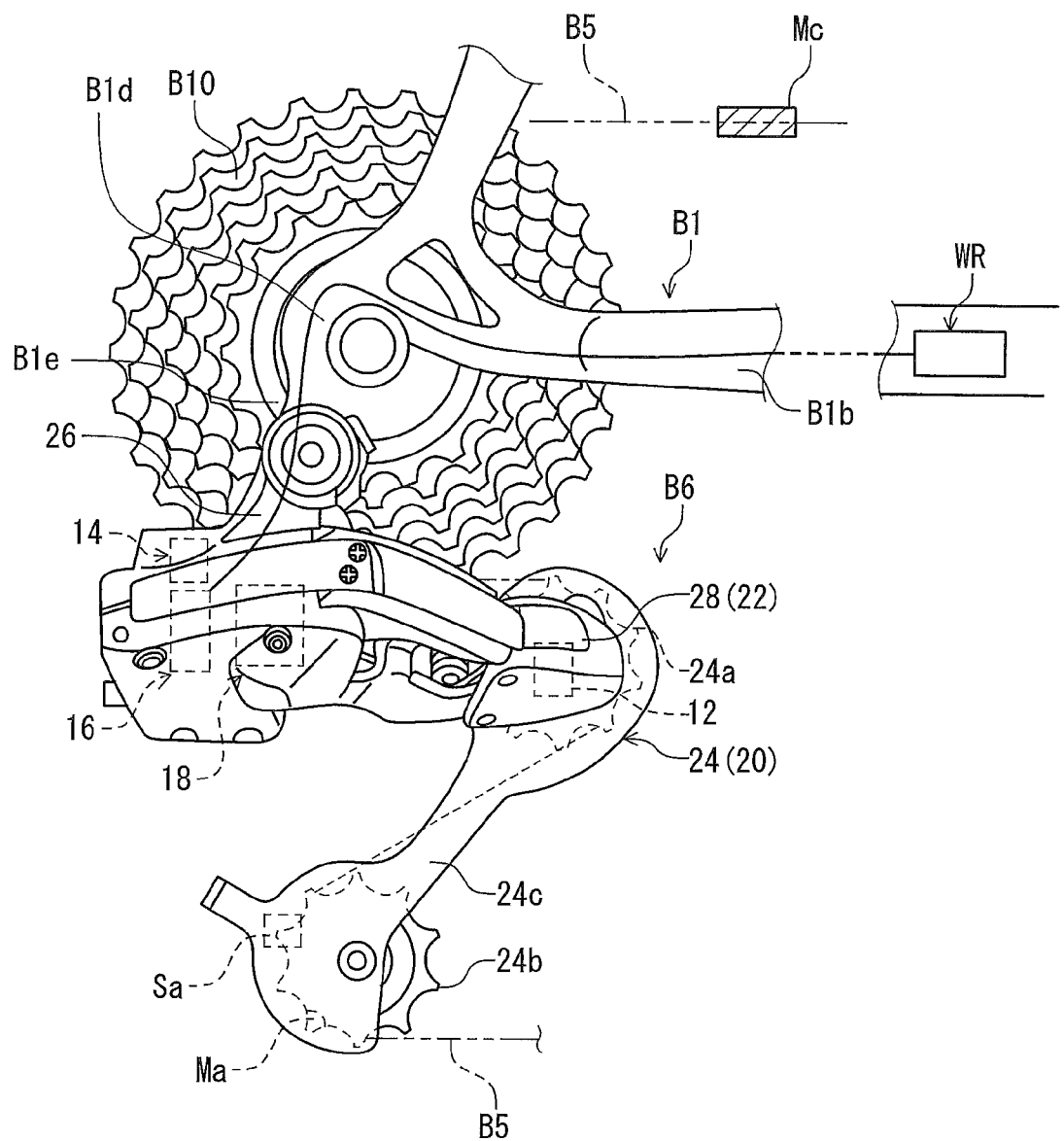
FIG. 25 is an enlarged view of a rear sprocket and a shifting device.

While the wireless receiver WR is provided in the shifting device B6 in FIGS. 2, 4, 8 to 11, 13, 14, 18, 20, 21, and 24, the wireless reviver WR can be provided at other positions. As seen in FIG. 25, for example, the wireless receiver WR can be attached to the bicycle frame B1 (e.g., one of the chainstays B1*b*) as a separate unit from the shifting device B6.

While the shifting device B6 is a bicycle rear derailleur, the shifting device can be a bicycle front derailleur. The second bicycle portion 22 includes a movable member 28 of the shifting device B6 in the above embodiments, the second bicycle portion 22 can include an adjustable seatpost B7 and a valve of the suspension 720A.

It will be apparent to those skilled in the bicycle field from the present disclosure that the constructions of the above embodiments can be at least partially combined with each other if needed and/or desired.

In the present application, the term "comprising" and its derivatives, as used herein, are intended to be open ended terms that specify the presence of the stated features, elements, components, portions, groups, integers, and/or step, but do not exclude the presence of other unstated features, elements, components, groups, integers and/or step. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The term "configured" as used herein to describe a component, portion, section or part of a device includes hardware and/or software that is constructed and/or programmed to carry out the desired function. The desired function can be carried out by hardware, software, or a combination of hardware and software.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A control system for a bicycle, comprising:
   a movement-information obtaining device configured to obtain movement information indicating a movement of at least part of a first bicycle portion and configured to wirelessly output the movement information;
   an actuator configured to actuate at least a second bicycle portion;
   an actuation controller having a wake mode to control the actuator based on an input signal and a sleep mode to be suspended under an electrical power consumption lower than an electrical power consumption in the wake mode; and
   a mode controller configured to wirelessly receive the movement information and configured to switch the actuation controller from the sleep mode to the wake mode based on the movement information.

2. The control system according to claim 1, wherein the mode controller includes a detector circuit configured to detect carrier wave including the movement information and is configured to switch the actuation controller from the sleep mode to the wake mode in response to detection of the movement information included in the carrier wave.

3. The control system according to claim 1, wherein the sleep mode includes a light sleep mode to be suspended under an electrical power consumption lower than an electrical power consumption in the wake mode and a deep sleep mode to be turned off, and wherein an electrical power consumption in the deep sleep mode is lower than an electrical power consumption in the light sleep mode.

4. The control system according to claim 1, wherein the second bicycle portion includes a movable member, and the movable member is configured to be movable relative to a base member that is configured to be attached to a bicycle frame.

5. The control system according to claim 4, wherein the first bicycle portion includes a chain cage assembly including
   at least one pulley configured to engage with a bicycle chain, and
   a pulley support member configured to rotatably support the at least one pulley,
   the movable member is configured to support the chain cage assembly thereon, the actuator is configured to move the movable member to shift the bicycle chain, and the movement-information obtaining device is configured to sense a rotation of the at least one pulley relative to the pulley support member to obtain the movement information.

6. The control system according to claim 1, wherein the first bicycle portion includes a bicycle frame and a wheel rotatable relative to the bicycle frame, and the movement-information obtaining device is configured to sense a rotation of the wheel relative to the bicycle frame to obtain the movement information.

7. The control system according to claim 1, wherein the first bicycle portion includes a bicycle frame and a bicycle chain, and the movement-information obtaining device is configured to sense a rotation of the bicycle chain relative to the bicycle frame to obtain the movement information.

8. The control system according to claim 1, wherein the first bicycle portion includes a bicycle frame and a crank assembly rotatable relative to the bicycle frame, and the movement-information obtaining device is configured to sense a rotation of the crank assembly relative to the bicycle frame to obtain the movement information.

9. The control system according to claim 1, wherein the first bicycle portion includes a bicycle frame and a crank assembly rotatable relative to the bicycle frame, and the movement-information obtaining device is configured to sense a pedaling force applied to the crank assembly to obtain the movement information.

10. The control system according to claim 1, further comprising:

a vibration-information obtaining device configured to obtain vibration information indicating a vibration of a bicycle, wherein the mode controller is configured to switch the actuation controller from the sleep mode to the wake mode based on the movement information and the vibration information.

11. A control system for a bicycle, comprising:

a rider-information obtaining device configured to obtain rider information indicating that a rider is on a bicycle from a third bicycle portion and configured to wirelessly output the rider information;

an actuator configured to actuate at least a second bicycle portion;

an actuation controller having a wake mode to control the actuator based on an input signal and a sleep mode to be suspended under an electrical power consumption lower than an electrical power consumption in the wake mode; and a mode controller configured to wirelessly receive the rider information and configured to switch the actuation controller from the sleep mode to the wake mode based on the rider information.

12. The control system according to claim 11, wherein the third bicycle portion includes a suspension, and the rider-information obtaining device is configured to obtain, as the rider information, a change in pressure in the suspension.

13. The control system according to claim 11, wherein the third bicycle portion includes a seatpost, and the rider-information obtaining device is configured to obtain, as the rider information, a change in pressure in the seatpost.

14. The control system according to claim 11, further comprising:

a vibration-information obtaining device configured to obtain vibration information indicating a vibration of the bicycle, wherein the mode controller is configured to switch the actuation controller from the sleep mode to the wake mode based on the rider information and the vibration information.

15. The control system according to claim 11, wherein the mode controller includes a detector circuit configured to detect carrier wave including the rider-information and is configured to switch the actuation controller from the sleep mode to the wake mode in response to detection of the movement information included in the carrier wave.

16. The control system according to claim 11, wherein the sleep mode includes a light sleep mode to be suspended under an electrical power consumption lower than an electrical power consumption in the wake mode and a deep sleep mode to be turned off, and wherein an electrical power consumption in the deep sleep mode is lower than an electrical power consumption in the light sleep mode.

17. A control system for a bicycle, comprising:

an operation-information obtaining device configured to obtain operation information indicating that a user operates an input part of an operating device to move a bicycle component of the bicycle and to wirelessly output the operation information;

an actuator configured to actuate at least a second bicycle portion;

an actuation controller having a wake mode to control the actuator based on an input signal and a sleep mode to be suspended under an electrical power consumption lower than an electrical power consumption in the wake mode; and a mode controller configured to wirelessly receive the operation information and configured to switch the actuation controller from the sleep mode to the wake mode based on the operation information.

18. The control system according to claim 17, further comprising:

a vibration-information obtaining device configured to obtain vibration information indicating a vibration of a bicycle, wherein the mode controller is configured to switch the actuation controller from the sleep mode to the wake mode based on the operation information and the vibration information.

19. The control system according to claim 17, wherein the mode controller includes a detector circuit configured to detect carrier wave including the operation information and is configured to switch the actuation controller from the sleep mode to the wake mode in response to detection of the movement information included in the carrier wave.

20. The control system according to claim 17, wherein the sleep mode includes a light sleep mode to be suspended under an electrical power consumption lower than an electrical power consumption in the wake mode and a deep sleep mode to be turned off, and wherein an electrical power consumption in the deep sleep mode is lower than an electrical power consumption in the light sleep mode.

* * * * *